(12) United States Patent
Radivojevic

(10) Patent No.: US 10,521,459 B2
(45) Date of Patent: Dec. 31, 2019

(54) FILTERING DATA LINEAGE DIAGRAMS

(71) Applicant: Ab Initio Technology LLC, Lexington, MA (US)

(72) Inventor: Dusan Radivojevic, North Andover, MA (US)

(73) Assignee: Ab Initio Technology LLC, Lexington, MA (US)

( * ) Notice: Subject to any disclaimer, the term of this patent is extended or adjusted under 35 U.S.C. 154(b) by 550 days.

(21) Appl. No.: 15/040,082

(22) Filed: Feb. 10, 2016

(65) Prior Publication Data

US 2016/0232229 A1 Aug. 11, 2016

Related U.S. Application Data

(60) Provisional application No. 62/114,684, filed on Feb. 11, 2015.

(51) Int. Cl.
*G06F 16/00* (2019.01)
*G06F 16/28* (2019.01)
*G06F 16/901* (2019.01)

(52) U.S. Cl.
CPC ........ *G06F 16/287* (2019.01); *G06F 16/9024* (2019.01)

(58) Field of Classification Search
CPC ......... G06F 17/30292; G06F 17/30572; G06F 17/30876; G06F 16/287; G06F 16/9024
USPC ................................. 707/754, 798
See application file for complete search history.

(56) References Cited

U.S. PATENT DOCUMENTS

| | | | |
|---|---|---|---|
| 5,966,072 A | 10/1999 | Stanfill | |
| 6,654,907 B2 | 11/2003 | Stanfill et al. | |
| 6,978,271 B1 * | 12/2005 | Hoffman | G06F 16/13 |
| 7,734,619 B2 | 6/2010 | Vierich et al. | |
| 9,063,998 B2 | 6/2015 | Kozina et al. | |
| 9,256,656 B2 | 2/2016 | Fankhauser et al. | |

(Continued)

FOREIGN PATENT DOCUMENTS

| | | |
|---|---|---|
| CN | 101682541 | 3/2010 |
| CN | 103180826 | 6/2013 |

(Continued)

OTHER PUBLICATIONS

BEA Systems Inc., "AquaLogic Data Services Platform (Administration Guide)," (146 pages) 2005.

(Continued)

*Primary Examiner* — Hanh B Thai
(74) *Attorney, Agent, or Firm* — Occhiuti & Rohlicek LLP

(57) ABSTRACT

Managing lineage information includes processing a request for a representation of data lineage for a first node of a number of nodes. The processing includes determining an association between the first node and at least a first tag identifier of a number of tag identifiers, and determining a first subset of at least one and fewer than all of a number of possible tag values for the first tag identifier, and traversing nodes along a first lineage path of directed links from the first node to determine a data lineage for the first node. Determining the data lineage includes, for each traversed node determining whether to add the traversed node to the data lineage or to exclude the traversed node from the data lineage based at least in part on any tag identifiers or tag values associated with the traversed node.

19 Claims, 18 Drawing Sheets

(56) References Cited

U.S. PATENT DOCUMENTS

| | | | |
|---|---|---|---|
| 9,430,583 B1* | 8/2016 | Flake | G06F 17/3092 |
| 9,712,554 B2 | 7/2017 | Hassanzadeh et al. | |
| 9,721,039 B2 | 8/2017 | Bier et al. | |
| 10,025,878 B1* | 7/2018 | Lefever | G06F 16/9024 |
| 2004/0010752 A1* | 1/2004 | Chan | G06F 17/30908 |
| | | | 715/234 |
| 2007/0011668 A1 | 1/2007 | Wholey et al. | |
| 2007/0061353 A1 | 3/2007 | Bobbin et al. | |
| 2007/0112714 A1* | 5/2007 | Fairweather | G06F 8/427 |
| | | | 706/46 |
| 2008/0183378 A1 | 7/2008 | Weidner | |
| 2009/0083313 A1 | 3/2009 | Stanfill et al. | |
| 2009/0216728 A1 | 8/2009 | Brainerd et al. | |
| 2010/0138420 A1 | 6/2010 | Bator et al. | |
| 2010/0138431 A1 | 6/2010 | Bator et al. | |
| 2011/0320460 A1 | 12/2011 | Fankhauser et al. | |
| 2012/0179726 A1 | 7/2012 | Roberts | |
| 2012/0209886 A1* | 8/2012 | Henderson | G06F 17/30557 |
| | | | 707/798 |
| 2012/0259793 A1* | 10/2012 | Umansky | G06Q 10/06 |
| | | | 705/348 |
| 2012/0271867 A1 | 10/2012 | Grossman et al. | |
| 2013/0091133 A1 | 4/2013 | Hashimoto et al. | |
| 2013/0290828 A1* | 10/2013 | Flake | G06F 17/30047 |
| | | | 715/234 |
| 2014/0019423 A1 | 1/2014 | Liensberger et al. | |
| 2014/0280362 A1* | 9/2014 | Henderson | G06F 17/30557 |
| | | | 707/798 |
| 2015/0012314 A1 | 1/2015 | Mohammad et al. | |
| 2015/0058278 A1* | 2/2015 | Fankhauser | G06F 17/30563 |
| | | | 707/602 |
| 2015/0081701 A1* | 3/2015 | Lerios | G06F 17/30876 |
| | | | 707/736 |
| 2016/0028580 A1 | 1/2016 | Radivojevic | |
| 2016/0232229 A1 | 8/2016 | Radivojevic | |
| 2016/0232230 A1 | 8/2016 | Radivojevic | |
| 2016/0308712 A1 | 10/2016 | Azriel et al. | |
| 2017/0033971 A1 | 2/2017 | Radivojevic | |
| 2017/0154087 A1 | 6/2017 | McClure et al. | |

FOREIGN PATENT DOCUMENTS

| | | |
|---|---|---|
| JP | 2002099561 | 4/2002 |
| JP | 2008027454 | 2/2008 |
| JP | 2011-517352 | 6/2011 |
| JP | 2012510689 | 5/2012 |
| JP | 2012-221502 | 11/2012 |
| JP | 2012221502 | 11/2012 |
| JP | 2012-510688 | 12/2014 |
| JP | 2014-225289 | 12/2014 |
| WO | 20140062278 | 4/2014 |

OTHER PUBLICATIONS

Oracle, "Oracle Warehouse Builder Concepts, 11g Release 2 (11.2)", (154 pages) 2000.

Oracle, "Oracle Warehouse Builder Installation and Administration Guide, 11g Release 1 (11.1) for Windows and UNIX" (198 pages), 2000.

International Search Report and Written Opinion, PCT Application No. PCT/US15/41452, dated Oct. 19, 2015 (12 pages).

International Search Report and Written Opinion, International Application No. PCT/US2016/017263, dated May 3, 2016 (12 pages).

Todd, Steve and Dan Hushon, "Scientific Lineage and Object-Based Storage Systems," 2009 5th IEEE International Conference on E-Science Workshops, Dec. 9, 2009 (pp. 52-58).

International Search Report and Written Opinion, International Application No. PCT/US2016/017246, dated Apr. 25, 2016 (12 pages).

Anand, M. K. et al., "Exploring scientific workflow provenance using hybrid queries over nested data and lineage graphs", International Conference on Scientific and Statistical Database Management (SSDBM) 2009, pp. 237-254.

Ikeda et al., "Data Lineage: A Survey", Stanford University, published 2009 [retrieved from internet on Jun. 6, 2019 http://ilpubs.stanford.edu:8090/918/1/lin_final.pdf].

* cited by examiner

FILTERING DATA LINEAGE DIAGRAMS

CROSS-REFERENCE TO RELATED APPLICATIONS

This application claims priority to U.S. Application Ser. No. 62/114,684, filed on Feb. 11, 2015, incorporated herein by reference.

BACKGROUND

This description relates to lineage tags for filtering of data lineage diagrams.

In data processing systems it is often desirable for certain types of users to have access to a visual representation of a lineage of data as it passes through the systems. Such "data lineage diagrams" can include graphical representations of data and entities in the system for processing that data and dependency relationships among them. Very generally, among a number of uses, such data lineage diagrams can be used to reduce risk, verify regulatory compliance obligations, streamline business processes, and safeguard data. It is important that data lineage diagrams are both correct and complete.

Some systems capable of generating and displaying data lineage diagrams are able to automatically present an end-to-end data lineage diagram showing representations of data items and the items representing processing entities that consume or generate those data items. In some examples, a lineage path upstream from a particular item is sometimes called a "dependency lineage" for that item, and a lineage path downstream from a particular item is sometimes called an "impact lineage" for that item. In other examples, a lineage path upstream from a particular item is called a "lineage" or "dependency" and a lineage path downstream from a particular item is called an "impact" or "impact analysis." As used herein, a "data lineage diagram" may include an upstream dependency lineage and/or a downstream impact lineage relative to any given item. Some systems capable of generating and displaying data lineage diagrams allow users to collapse logical and/or physical groups of items in a data lineage diagram into a single element. Some systems capable of generating and displaying data lineage diagrams are able to enhance data lineage diagrams with enriched data information such as data quality scoring.

SUMMARY

In one aspect, in general, a method for managing lineage information in a computing system includes storing, in a data storage system, a specification of a directed graph that includes a number of nodes and directed links that represent respective lineage relationships between the nodes, at least some of the nodes being associated with one or more tag identifiers of a number of tag identifiers, at least one tag identifier of the tag identifiers having a number of possible tag values and processing, using at least one processor, a request for a representation of data lineage for a first node of the number of nodes. The processing includes determining an association between the first node and at least a first tag identifier of the number of tag identifiers, and determining a first subset of at least one and fewer than all of a number of possible tag values for the first tag identifier and traversing nodes along a first lineage path of directed links from the first node to determine a data lineage for the first node. The data lineage includes one or both of (1) a dependency lineage that consists of a unidirectional upstream lineage path of directed links upstream of the first node, and (2) an impact lineage that consists of a unidirectional downstream lineage path of directed links downstream of the first node. Determining the data lineage includes, for each traversed node determining whether to add the traversed node to the data lineage or to exclude the traversed node from the data lineage based at least in part on any tag identifiers or tag values associated with the traversed node.

Aspects may include one or more of the following features.

Determining the data lineage may includes, for each traversed node adding the traversed node to the data lineage if the traversed node is not associated with the first tag identifier, or the traversed node is associated with the first tag identifier and is associated with at least one tag value of the first subset, or excluding the traversed node from the data lineage if the traversed node is associated with the first tag identifier and is not associated with at least one tag value of the first subset of the number of possible tag values for the first tag identifier.

Upon excluding a traversed node from the data lineage traversing of the first lineage path may be terminated. The method may include analyzing the number of nodes, prior to traversing the nodes of the number of nodes, to determine a first subset of the number of nodes that are associated with the first tag identifier and are not associated with at least one tag value of the first subset of the number of possible tag values for the first tag identifier. Determining whether to add the traversed node to the data lineage or to exclude the traversed node from the data lineage may include determining whether the traversed node is included in the first subset of the number of nodes. Determining whether to add the traversed node to the data lineage may include adding the traversed node to the data lineage if the traversed node is not included in the first subset of the number of nodes and excluding the traversed node from the data lineage if the traversed node is included in the first subset of the number of nodes.

At least some nodes of the number of nodes may be nested within other nodes of the number of nodes. Tag identifiers and their associated subsets of tag values associated with nodes at lower levels of a nested hierarchy of nodes may be given priority over tag identifiers and their associated subsets of tag values associated with nodes at higher levels of the nested hierarchy of nodes. Traversing the nodes along the first lineage path may include traversing the nodes beginning from the first node and in a direction opposite a direction of the directed links.

The method may further include generating the specification of the directed graph, where one or more of the number of nodes represent computation, one or more of the number of nodes represent data elements received or produced by a computation during execution of the computation, and the directed links represent lineage relationships between a computation and a data element. One or more of the number of nodes may represent a grouping of one or more other nodes of the number of nodes. The first subset of the number of possible tag values for the first tag identifier may consist of one or more tag values that are associated with the first node.

The first subset of the number of possible tag values for the first tag identifier may consist of one or more tag values that are received from user input. The method may further include traversing nodes along a number of lineage paths of directed links from the first node to determine a data lineage for the first node, where determining the data lineage includes, for each traversed node determining whether to add the traversed node to the data lineage or to exclude the traversed node from the data lineage based at least in part on any tag identifiers or tag values associated with the traversed node. The method may further include adding the first node to the data lineage by default.

In another aspect, in general, software stored on a computer-readable medium, for managing lineage information in a computing system includes instructions for causing a computing system to store, in a data storage system, a specification of a directed graph that includes a number of nodes and directed links that represent respective lineage relationships between the number of nodes, at least some of the nodes being associated with one or more tag identifiers of a number of tag identifiers, at least one tag identifier of the number of tag identifiers having a number of possible tag values and process, using at least one processor, a request for a representation of data lineage for a first node of the number of nodes. The processing includes determining an association between the first node and at least a first tag identifier of the number of tag identifiers, and determining a first subset of at least one and fewer than all of a number of possible tag values for the first tag identifier; and traversing nodes along a first lineage path of directed links from the first node to determine a data lineage for the first node, where the data lineage includes one or both of (1) a dependency lineage that consists of a unidirectional upstream lineage path of directed links upstream of the first node, and (2) an impact lineage that consists of a unidirectional downstream lineage path of directed links downstream of the first node, and where determining the data lineage includes, for each traversed node determining whether to add the traversed node to the data lineage or to exclude the traversed node from the data lineage based at least in part on any tag identifiers or tag values associated with the traversed node.

In another aspect, in general, a computing system for managing lineage information includes a data storage system storing a specification of a directed graph that includes a number of nodes and directed links that represent respective lineage relationships between the number of nodes, at least some of the nodes being associated with one or more tag identifiers of a number of tag identifiers, at least one tag identifier of the number of tag identifiers having a number of possible tag values and at least one processor configured to process a request for a representation of data lineage for a first node of the number of nodes. The processing includes determining an association between the first node and at least a first tag identifier of the number of tag identifiers, and determining a first subset of at least one and fewer than all of a number of possible tag values for the first tag identifier and traversing nodes along a first lineage path of directed links from the first node to determine a data lineage for the first node, where the data lineage includes one or both of (1) a dependency lineage that consists of a unidirectional upstream lineage path of directed links upstream of the first node, and (2) an impact lineage that consists of a unidirectional downstream lineage path of directed links downstream of the first node, and where determining the data lineage includes, for each traversed node determining whether to add the traversed node to the data lineage or to exclude the traversed node from the data lineage based at least in part on any tag identifiers or tag values associated with the traversed node.

In another aspect, in general, a computing system for managing lineage information includes means for storing a specification of a directed graph that includes a number of nodes and directed links that represent respective lineage relationships between the number of nodes, at least some of the nodes being associated with one or more tag identifiers of a number of tag identifiers, at least one tag identifier of the number of tag identifiers having a number of possible tag values and means for processing a request for a representation of data lineage for a first node of the number of nodes. The processing includes determining an association between the first node and at least a first tag identifier of the number of tag identifiers, and determining a first subset of at least one and fewer than all of a number of possible tag values for the first tag identifier, and traversing nodes along a first lineage path of directed links from the first node to determine a data lineage for the first node, where the data lineage includes one or both of (1) a dependency lineage that consists of a unidirectional upstream lineage path of directed links upstream of the first node, and (2) an impact lineage that consists of a unidirectional downstream lineage path of directed links downstream of the first node, and where determining the data lineage includes, for each traversed node determining whether to add the traversed node to the data lineage or to exclude the traversed node from the data lineage based at least in part on any tag identifiers or tag values associated with the traversed node.

Aspects can include one or more of the following advantages.

In some general aspects, approaches described herein are applicable to lineage diagrams where a user has augmented nodes with additional information in the form of lineage tags. The lineage tags are used to filter the lineage diagrams such that a particular, user-defined dimension can be targeted without limiting the lineage to just objects adjacent to, or within a direct lineage or impact path of, an object singled out by the filtering.

The approaches described herein can be used for reducing complexity in a more selective manner than other techniques (e.g., simple filtering, or Lineage Summarization). For example, one source of complexity in some lineage diagrams are nodes that perform normalization and de-normalization operations, and the use of lineage tags can aid in reducing the complexity in such lineage diagrams, as described in more detail herein.

The approaches enable selectivity by allowing a user to define different types of tags, each with its own set of enumerated values. Each type of tag serves as its own independent filtering dimension. Tags can also be defined automatically based on the configuration of the lineage diagrams, such as for nodes that perform normalization and de-normalization.

In some examples, an algorithm for selecting which nodes to include and exclude from a filtered data lineage diagram walks the nodes of a lineage diagram and determines what to exclude by comparing encountered tags (of any nodes that have are associated with tags) with a set of active tags.

Among other advantages, approaches described herein don't simply limit the diagram to nodes upstream and downstream of items with active tags. Instead, untagged nodes also remain in the diagram. Thus, the approaches allow for surgical removal of nodes that are upstream or downstream of undesired members of an enumerated set. This selectivity advantageously provides the ability to solve problems that cannot be solved with simple filtering, or with Lineage Summarization (e.g., normalization/de-normalization of data or overloaded objects).

As the complexity of data processing systems has increased, data lineage diagrams have also become increasingly complex, presenting many nodes (e.g., data nodes and data transformation nodes, collectively referred to as 'nodes'), represented by respective icons, in a single view. As the number of nodes presented to a user in a data lineage diagram increases, the data lineage diagram may become difficult to understand.

In some examples, data processing graphs include many partially overlapping data lineage paths, a few of which a user is generally interested in. For example, in an upstream portion of a data processing graph, there may be many different systems that process data based on, for example, geographic region. In a middle portion of the data processing graph, the data from the upstream portion of the graph is grouped, and in a downstream portion of the graph, the grouped data is processed. A user may be interested in analyzing a lineage path for a single geographic region.

The approaches described herein leverage a realization that, within a given data processing system, certain nodes that are related to one another are often the same nodes that a user is interested in viewing. In the approaches described herein, sets of nodes that are related to one another are associated using lineage tags. The nodes can then be filtered based on the lineage tags to allow a user to generate a filtered data lineage diagram, including only nodes that the user is interested in viewing.

Other features and advantages of the invention will become apparent from the following description, and from the claims.

DESCRIPTION

Figure 1:
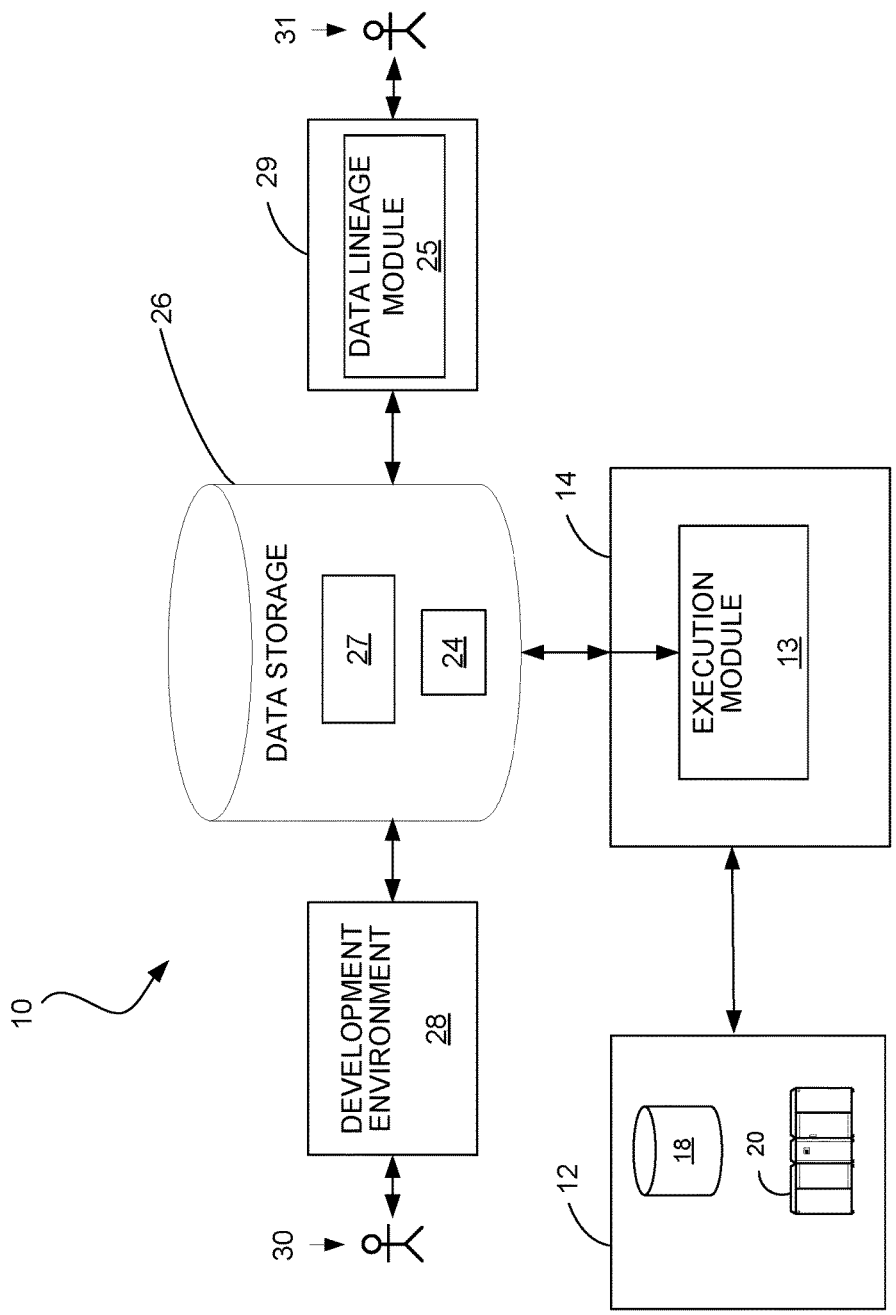
FIG. 1 is a block diagram of a data processing system including lineage filtering features.

FIG. 1 shows an example of a data processing system 10 in which lineage tag based data lineage filtering techniques can be used. The system 10 includes a data source 12 that may include one or more sources of data such as storage devices or connections to online data streams, each of which may store or provide data in any of a variety of formats (e.g., database tables, spreadsheet files, flat text files, or a native format used by a mainframe). An execution environment 14 includes an execution module 13. The execution environment 14 may be hosted, for example, on one or more general-purpose computers under the control of a suitable operating system, such as a version of the UNIX operating system. For example, the execution environment 14 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

Storage devices providing the data source 12 may be local to the execution environment 14, for example, being stored on a storage medium connected to a computer hosting the execution environment 14 (e.g., hard drive 18), or may be remote to the execution environment 14, for example, being hosted on a remote system (e.g., mainframe 20) in communication with a computer hosting the execution environment 14, over a remote connection (e.g., provided by a cloud computing infrastructure).

The system 10 includes a development environment 28 in which a developer 30 is able to specify a data processing computer program 27 (e.g., a dataflow graph) and store the program in a data storage system 26 accessible to the execution environment 14. The execution module 13 processes data from the data source according to the computer program 27 to generate output data 24. The output data may be 24 stored back in the data source 12 or in the data storage system 26, or otherwise used. The development environment 28 is, in some implementations, a system for developing applications as dataflow graphs that include vertices (representing data processing components or datasets) connected by directed links (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication lineage paths according to the links of the graph can use TCP/IP or UNIX domain sockets, or use shared memory to pass data between the processes).

The system 10 includes an enterprise environment 29 through which a user 31 (e.g., an enterprise user or data architect) can request and view data lineage diagrams. To generate data lineage diagrams, the enterprise environment 29 includes a data lineage module 25, which analyzes system metadata including metadata that characterizes data transformation nodes representing computations corresponding to different portions of the computer program 27 (e.g., different dataflow graphs or different components within a dataflow graph) and metadata that characterizes data nodes accessed or generated by the computer program 27 (e.g., datasets from the data source 12 or datasets corresponding to the output data 24) to generate data lineage diagrams.

In some examples, the metadata characterizing data transformation nodes and/or data nodes includes data lineage tags (sometimes referred to as 'lineage tags'). Very generally, each lineage tag has a tag identifier and a number of possible tag values. For example, one exemplary lineage tag may have a tag identifier of "Region" and possible tag values of "U.S., U.K., Mexico, Canada."

At least some of the nodes (i.e., data transformation nodes and/or data nodes) in the computer program 27 are associated with one or more lineage tags and a subset of the possible tag values for the lineage tag, the subset including at least one and fewer than all of the possible tag values for the one or more lineage tags.

Figure 2A:
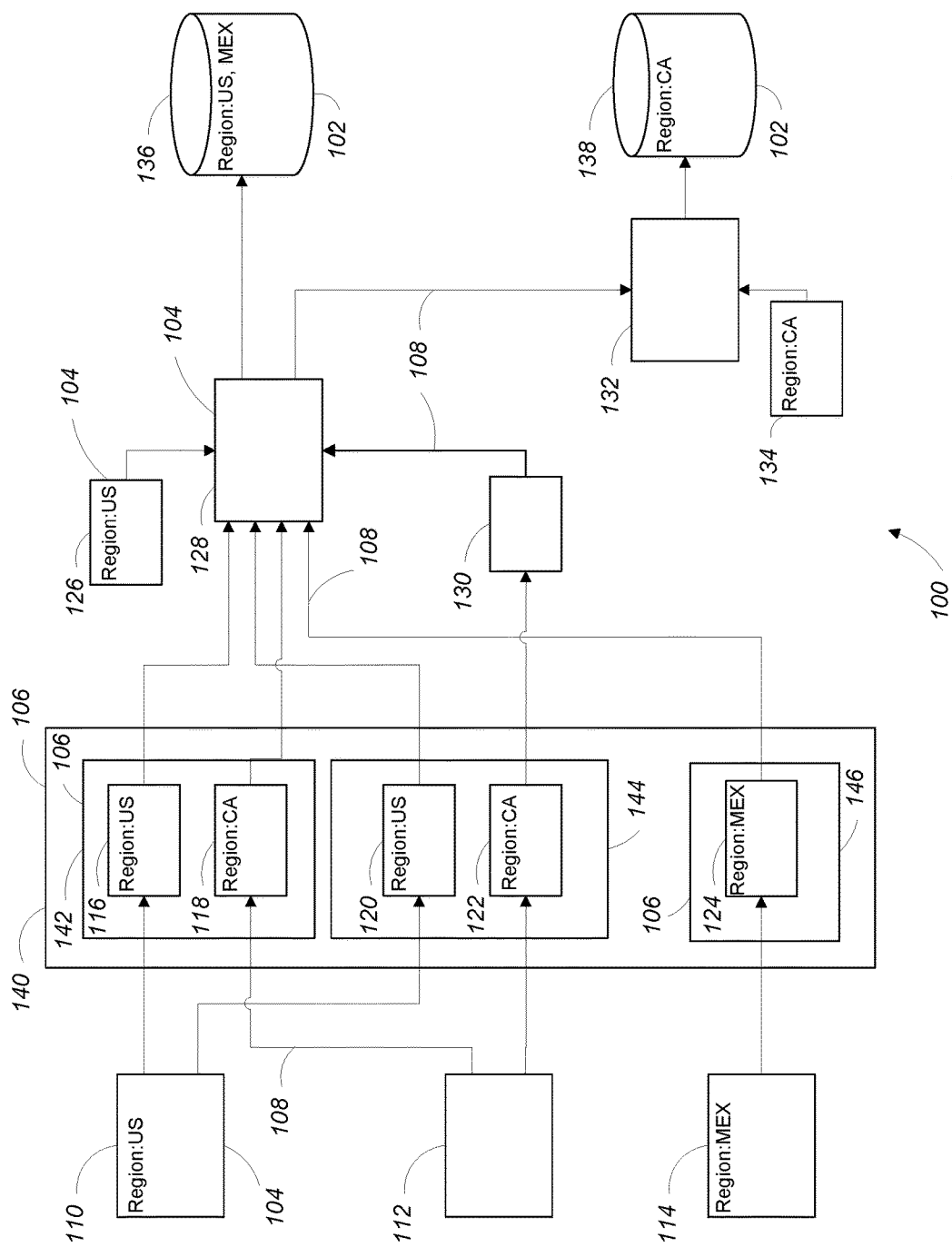
FIG. 2a is a data lineage diagram including nodes with lineage tags.

Referring to FIG. 2a, an exemplary end-to-end data lineage diagram 100 for the computer program 27 includes a number of data nodes 102, a number of data transformation nodes 104, and a number of container nodes 106, all interconnected by directed links 108.

In particular, the diagram 100 includes a first data transformation node 110, a second data transformation node 112, a third data transformation node 114, a fourth data transformation node 116, a fifth data transformation node 118, a sixth data transformation node 120, a seventh data transformation node 122, an eighth data transformation node 124, a ninth data transformation node 126, a tenth data transformation node 128, an eleventh data transformation node 130, a twelfth data transformation node 132, and a thirteenth data transformation node 134. The diagram 100 includes a first data node 136 and a second data node 138. The diagram 100 includes a first container node 140, a second container node 142, a third container node 144, and a fourth container node 146.

The first data transformation node 110 is associated with the "Region" lineage tag. In this example, the "Region" lineage tag has three possible tag values: "US, CA, MEX." The first transformation node 110 is associated with a subset of the possible tag values for the "Region" lineage tag including "US." The third data transformation node 114 is associated with the "Region" lineage tag and with a subset of possible tag values for the "Region" lineage tag including "MEX." The fourth data transformation node 116 is associated with the "Region" lineage tag and with a subset of possible tag values for the "Region" lineage tag including "US." The fifth data transformation node 118 is associated with the "Region" lineage tag and with a subset of possible tag values for the "Region" lineage tag including "CA." The sixth data transformation node 120 is associated with the "Region" lineage tag and with a subset of possible tag values for the "Region" lineage tag including "US."

The seventh data transformation node 122 is associated with the "Region" lineage tag and with a subset of possible tag values for the "Region" lineage tag including "CA." The eighth data transformation node 124 is associated with the "Region" lineage tag and with a subset of possible tag values for the "Region" lineage tag including "MEX." The ninth data transformation node 126 is associated with the "Region" lineage tag and with a subset of possible tag values for the "Region" lineage tag including "US." The thirteenth data transformation node 134 is associated with the "Region" lineage tag and with a subset of possible tag values for the "Region" lineage tag including "CA."

The first data node 136 is associated with the "Region" lineage tag and with a subset of possible tag values for the "Region" lineage tag including "US, MEX." The second data node 138 is associated with the "Region" lineage tag and with a subset of possible tag values for the "Region" lineage tag including "CA."

1 Filtered Data Lineage Generation

Figure 2B:
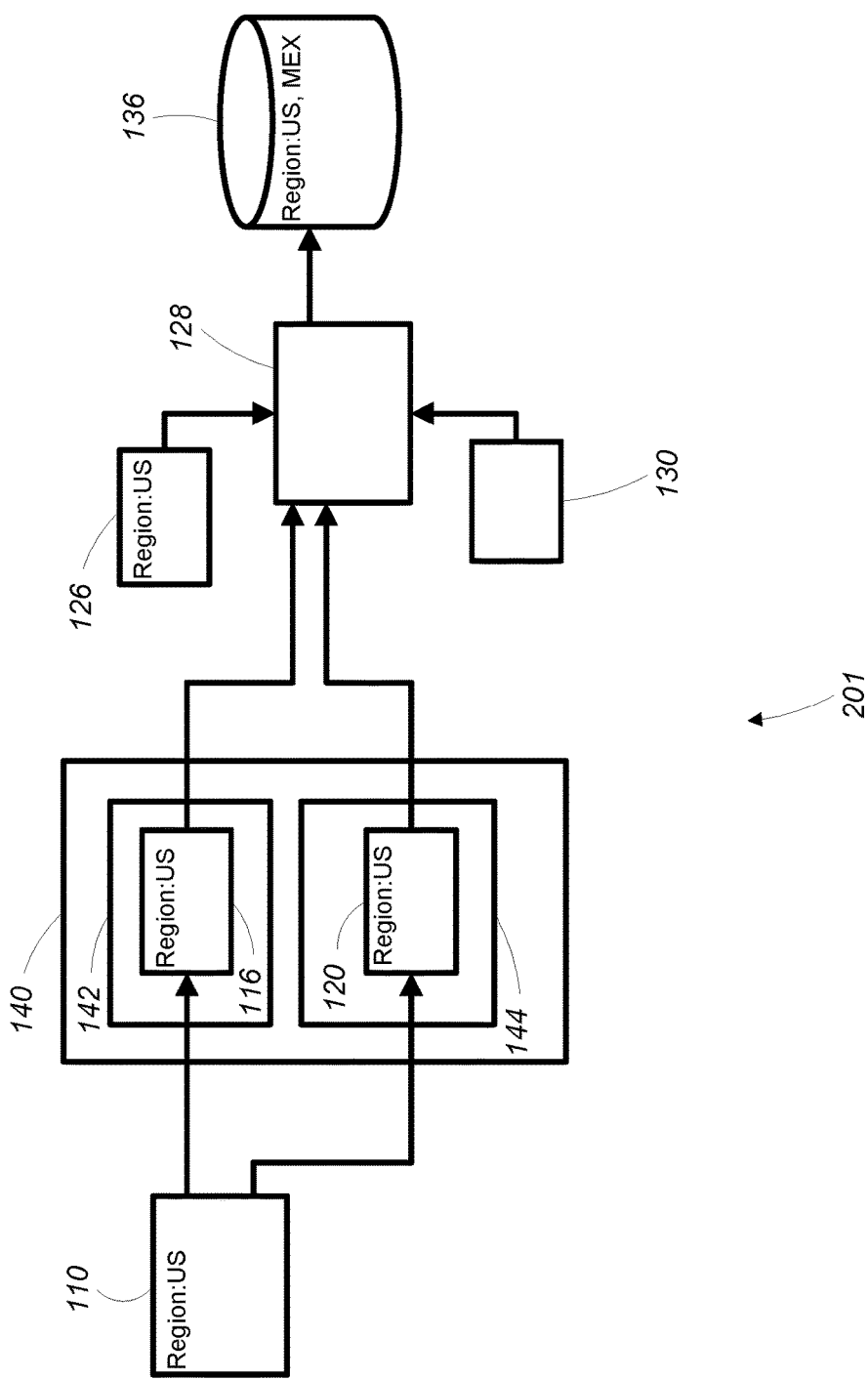
FIG. 2b is a first filtered data lineage diagram for Region: US.

In some examples, the end-to-end data lineage diagram 100 of FIG. 2a is processed by the data lineage module 25 to generate a filtered data lineage diagram. Referring to FIG. 2b, one example of a filtered data lineage diagram 201 is a version of the end-to-end data lineage diagram 100 that is filtered according to the "Region" lineage tag and the "US" lineage tag value. As can be seen in the figure, the filtered data lineage diagram 201 is greatly simplified as compared to the end-to-end data lineage diagram 100 of FIG. 2a since nodes associated with the "Region" lineage tag identifier and having lineage tag values including only "CA" or only "MEX" are excluded from the data lineage.

As is described in detail below with reference to FIGS. 3-12, to arrive at a filtered data lineage diagram such as the first filtered data lineage diagram 200 of FIG. 12, a user selects a node and commands the data lineage module 25 to determine a filtered data lineage for the node. The data lineage module 25 first determines an association between the selected node and one or more tag identifiers. For each tag identifier associated with the selected node, the data lineage module 25 determines which tag values of the possible tag values for the tag identifier are associated with the selected node. In general, a user may select any number of tag values to be associated with the selected node. The selected tag values may represent a subset of the possible tag values, such as a single tag value (e.g., "US" as in the example of FIG. 2b), or multiple tag values (e.g., "US" and "MEX" as in the example of FIG. 12). Typically, some number of tag values less than all of the possible tag values associated with the tag identifier are selected.

The data lineage module 25 then traverses one or more lineage paths originating from the selected node to determine the filtered data lineage for the selected node. In general, each lineage path includes on or more nodes connected by directed links. As the data lineage module 25 traverses the one or more nodes, it decides whether to add nodes to or exclude nodes from the filtered data lineage based on any tag identifiers or tag values associated with the one or more traversed nodes.

Figure 3:
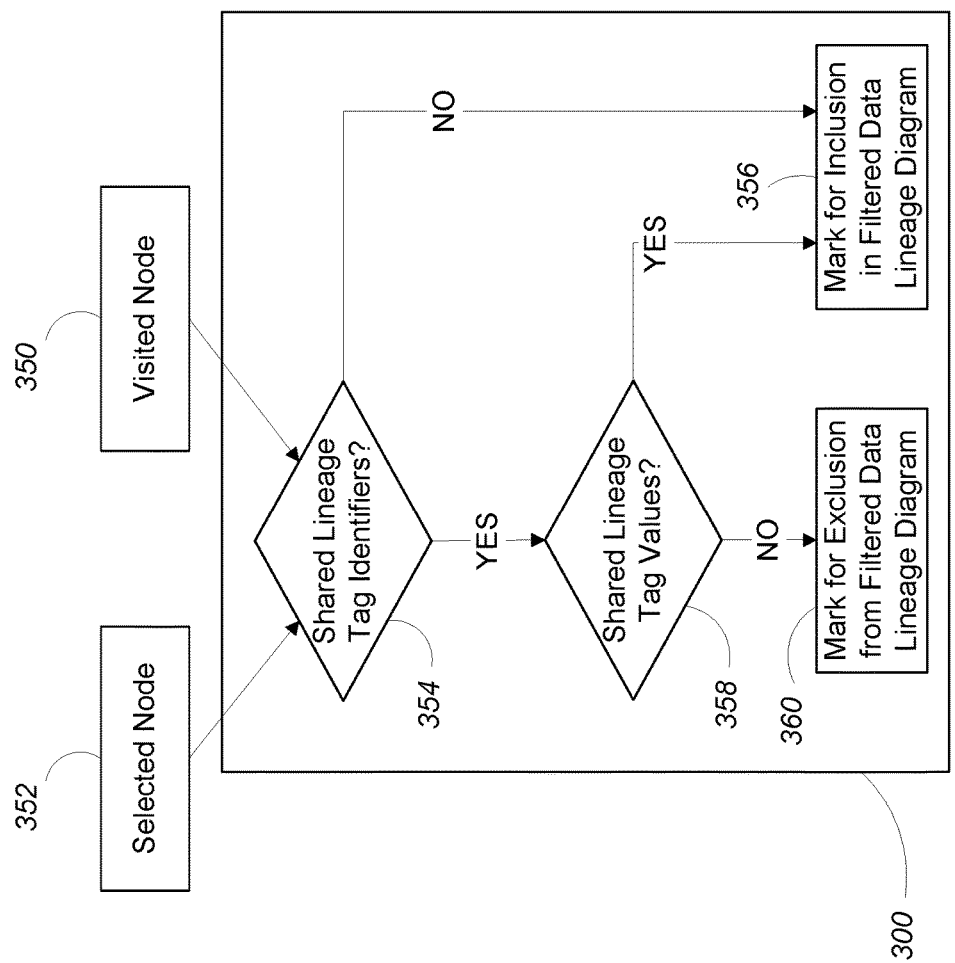
FIG. 3 is a block diagram of a filtering algorithm.

Referring to FIG. 3, in some examples, as the data lineage module 25 traverses the lineage paths, a filtering algorithm 300 is used to determine whether the nodes along the lineage paths should be marked for inclusion in the filtered data lineage diagram or should be marked for exclusion from the filtered data lineage diagram.

In particular, when the data lineage module 25 arrives at a visited node 350 on a lineage path, the visited node 350 and the selected node 352 are provided to the filtering algorithm 300.

At a first step 354 in the filtering algorithm 300, a test is performed to determine whether any lineage tag identifiers associated with the visited node 350 match the lineage tag identifiers associated with the selected node 352. If none of the lineage tag identifiers match, the algorithm proceeds to a second step 356 in which the visited node 350 is marked for inclusion in the filtered data lineage diagram. If one or more of the lineage tag identifiers associated with both the visited node 350 and the selected node 352 match, the algorithm proceeds to a third step 358.

At the third step 358, for each identified matching lineage tag identifier, a test is performed to determine whether one or more of the lineage tag values associated with the visited node 350 for the lineage tag identifier match one or more of the lineage tag values associated with the selected node 352 for the lineage tag identifier. If one or more of the lineage tag values associated with the visited node 350 for the lineage tag identifier matches one or more of the lineage tag values associated with the selected node 352 for the lineage tag identifier, the algorithm proceeds to the second step 356 in which the visited node 350 is marked for inclusion in the filtered data lineage diagram.

Alternatively, if none of the lineage tag values associated with the visited node 350 for the lineage tag identifier matches any of the lineage tag values associated with the selected node 352 for the lineage tag identifier, the algorithm proceeds to a fourth step 360 in which the visited node 350 is marked for exclusion from the filtered data lineage diagram.

In some examples, the filtering algorithm 400 is performed as the data lineage module 25 traverses lineage paths in the end-to-end data lineage. In other examples, once a node is selected for data lineage computation and before any lineage paths are traversed, the filtering algorithm is applied to all nodes in the end-to-end data lineage other than the selected node. Any nodes that the filtering algorithm 300 marks for exclusion from the filtered data lineage diagram are added to a "blacklist." The data lineage module 25 then traverses the lineage paths originating from the selected node. At each node visited by the data lineage module 25, the data lineage module 25 searches the blacklist to determine whether the visited node is present in the blacklist. If the visited node is present in the blacklist, traversal of the lineage path is terminated and the visited node is not included in the filtered data lineage.

Figure 4:
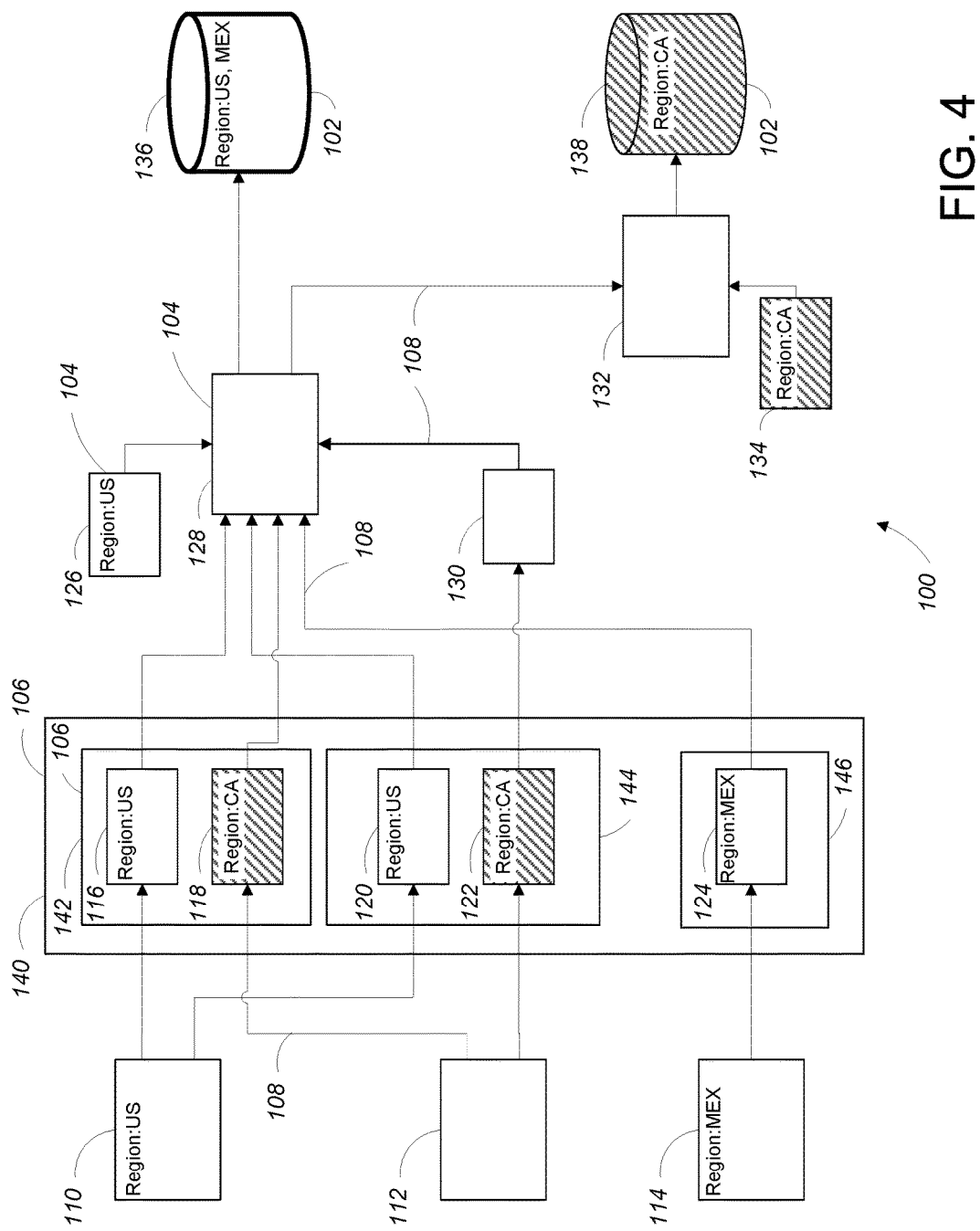
FIG. 4 is the data lineage diagram of FIG. 2a with a node selected and nodes added to a blacklist.

Referring to FIG. 4, a user has selected the first data node 136 of the end-to-end data lineage diagram 100 of FIG. 2a for generation of a filtered data lineage. As is noted above, the first data node 136 is associated with the "Region" lineage tag identifier and is associated with a subset of the possible tag values for the "Region" lineage tag identifier including "US, MEX" and not including the lineage tag value "CA."

Since the "CA" lineage tag value for the "Region" lineage tag identifier is not included in the subset of lineage tag values associated with the first data node 136, the data lineage module 25 is configured to exclude nodes that are both associated with the "Region" lineage tag identifier and have a subset of tag values including only "CA" from the data lineage.

In some examples, after receiving the selection of the first data node 136, the data lineage module 25 processes the end-to-end data lineage diagram 100 to generate a blacklist. As is described above, the blacklist is generated by examining all nodes other than the first data node 136 to identify nodes associated with the "Region" lineage tag identifier and having a subset of tag values including only "CA." Applying the filtering algorithm 300 to the end-to-end data lineage of FIG. 4 results in the fifth data transformation node 118, the seventh data transformation node 122, the thirteenth data transformation node 134, and the second data node 138 being added to the blacklist. In FIG. 4, nodes that are added to the blacklist are filled with a diagonal line pattern.

Once the blacklist is generated, each of the lineage paths (i.e., nodes connected by directed links 108) originating from the first data node 136 are traversed until either a node at the edge of the end-to-end lineage diagram 100 is visited or a node on the blacklist is visited. In the case that a node at the edge of the end-to-end data lineage diagram 100 is encountered, the entire lineage path leading up to and including the node is included in the filtered data lineage. In the case that a node on the blacklist is encountered, the traversal of the lineage path is terminated and the lineage path leading up to, but not including the node on the blacklist is included in the filtered data lineage.

Figure 5:
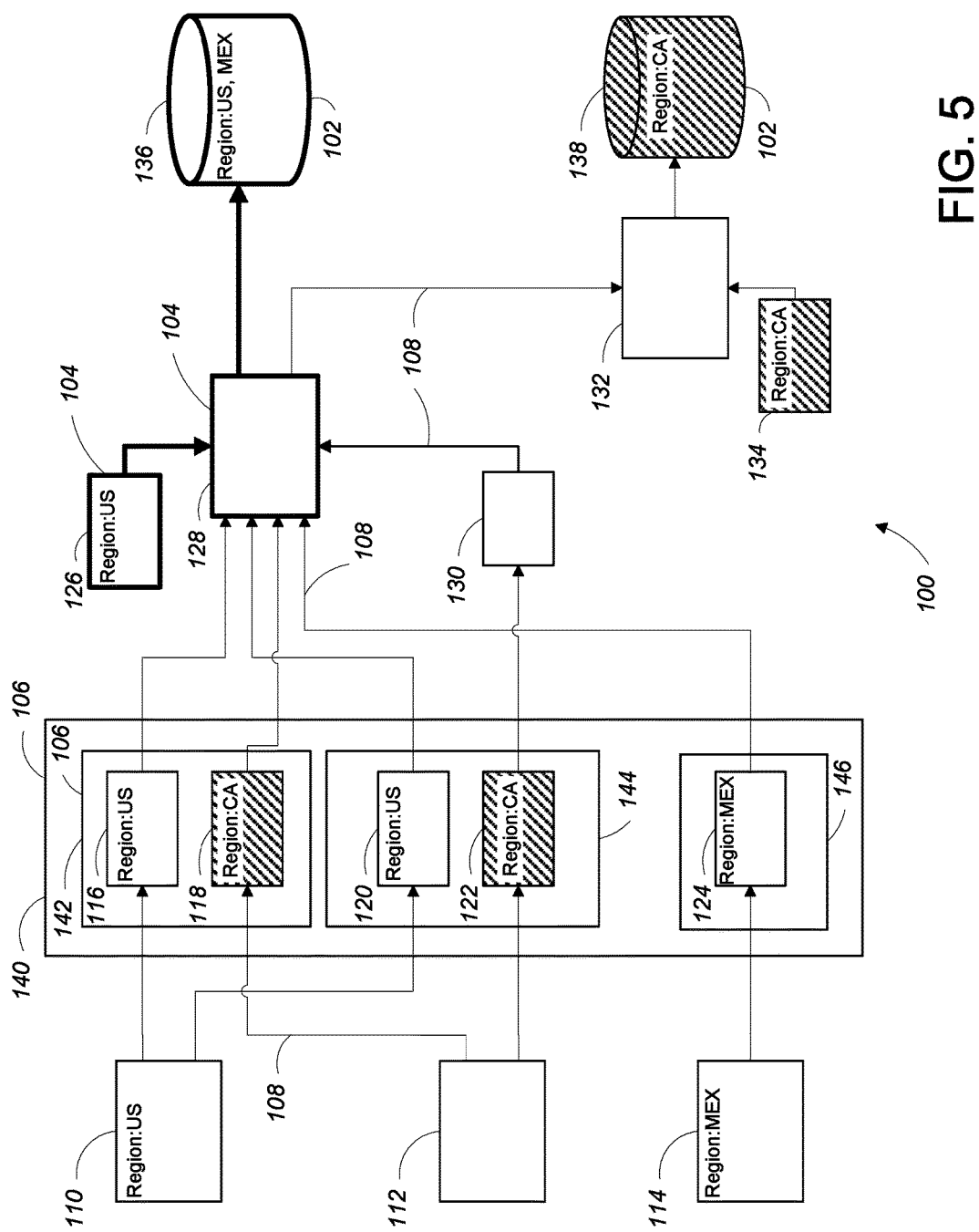
FIG. 5 is the data lineage diagram of FIG. 2a with a first data lineage path traversed.

Referring to FIG. 5, a first lineage path between the first data node 136 and the ninth data transformation node 126 is traversed by the data lineage module 25. Since the first data node 136 was selected by the user, it is marked for inclusion in the filtered data lineage by default. A directed link 108 between the first data node 136 and the tenth data transformation node 128 is then traversed. The blacklist is then searched to determine whether it includes tenth data transformation node 128. Since the tenth data transformation node 128 is not present in the blacklist, it is marked for inclusion in the filtered data lineage. A directed link 108 between the tenth data transformation node 128 and the ninth data transformation node 126 is then traversed. The blacklist is then searched to determine whether it includes the ninth data transformation node 126. Since the ninth data transformation node 126 is not present in the blacklist, it is marked for inclusion in the filtered data lineage. Since the ninth data transformation node 126 is at the edge of the end-to-end lineage diagram 100, traversal of the first lineage path is complete.

Figure 6:
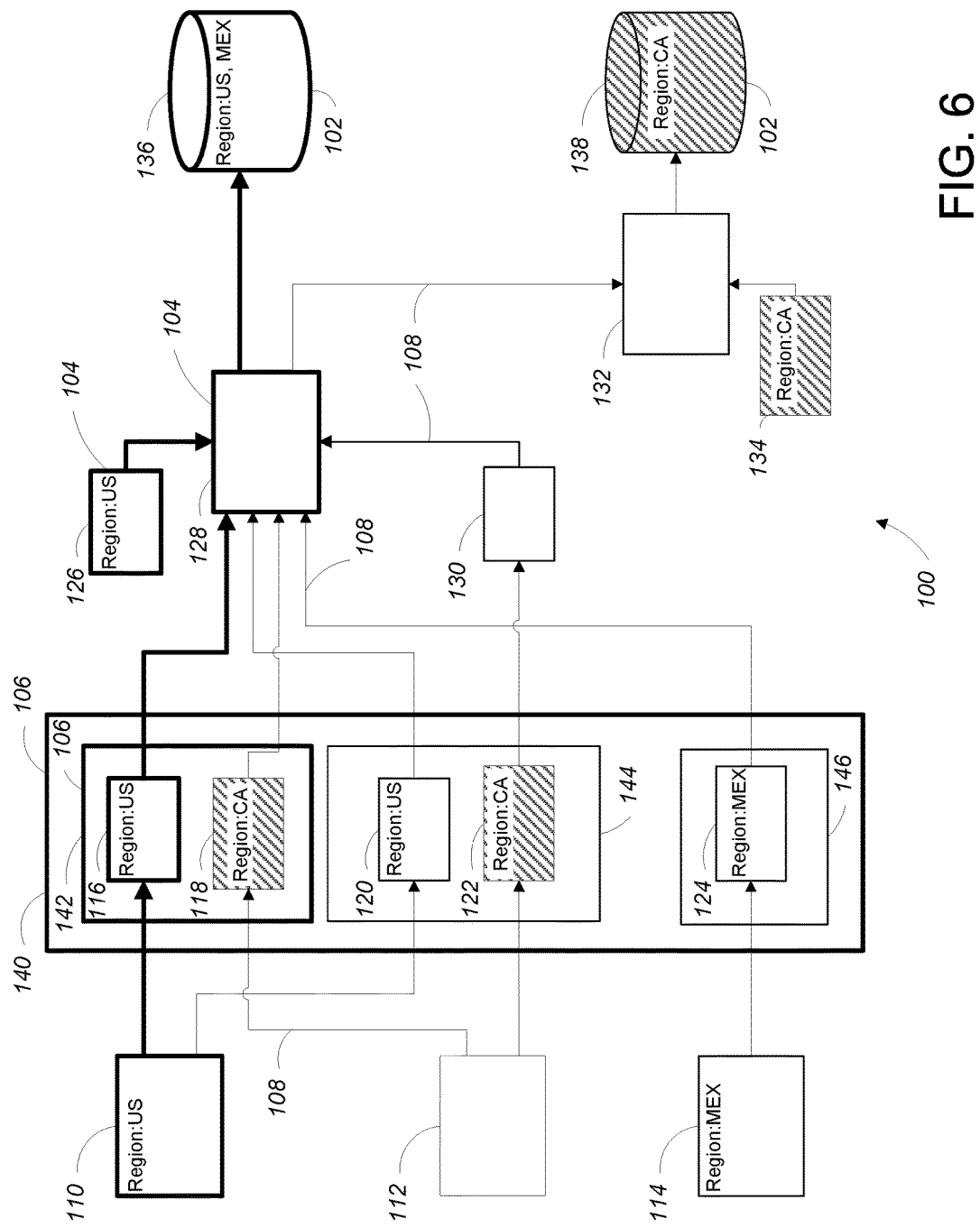
FIG. 6 is the data lineage diagram of FIG. 2a with a second data lineage path traversed.

Referring to FIG. 6, a second lineage path extending between the first data node 136 and the first data transformation node 110 is traversed by the data lineage module 25. Since the directed link 108 between the first data node 136 and the tenth data transformation node 128 was previously traversed, the data lineage module 25 begins its traversal by traversing the directed link 108 between the tenth data transformation node 128 and the fourth data transformation node 116.

When the lineage module 25 reaches the fourth data transformation node 116, the blacklist is searched to determine whether it includes the fourth data transformation node 116. Since the fourth data transformation node 116 is not present in the blacklist, it is marked for inclusion in the filtered data lineage. Note that the fourth data transformation node 116 is included in the second container node 142 which is nested in the first container node 140. Neither the first container node 140 nor the second container node 142 is associated with any lineage tag identifiers and therefore neither is included in the blacklist. Since the second lineage path traverses the boundaries of the first container node 140 and the second container node 142 and neither container node is in the blacklist, both the first container node 140 and the second container node 142 are marked for inclusion in the filtered data lineage. Note that, in some examples, if a container node is marked with a lineage tag identifier and value, all of its descendant nodes (i.e., child nodes and their children) are marked with the same lineage tag identifier and value. The blacklist can therefore be constructed based on the lowest level nodes.

The data lineage module 25 then traverses a directed link 108 between the fourth data transformation node 116 and the first data transformation node 110. When the lineage module 25 reaches the first data transformation node 110, the blacklist is searched to determine whether it includes the first data transformation node 110. Since the first data transformation node 110 is not present in the blacklist, it is marked for inclusion in the filtered data lineage. Since the first data transformation node 110 is at the edge of the end-to-end lineage diagram 100, traversal of the second lineage path is complete.

Figure 7:
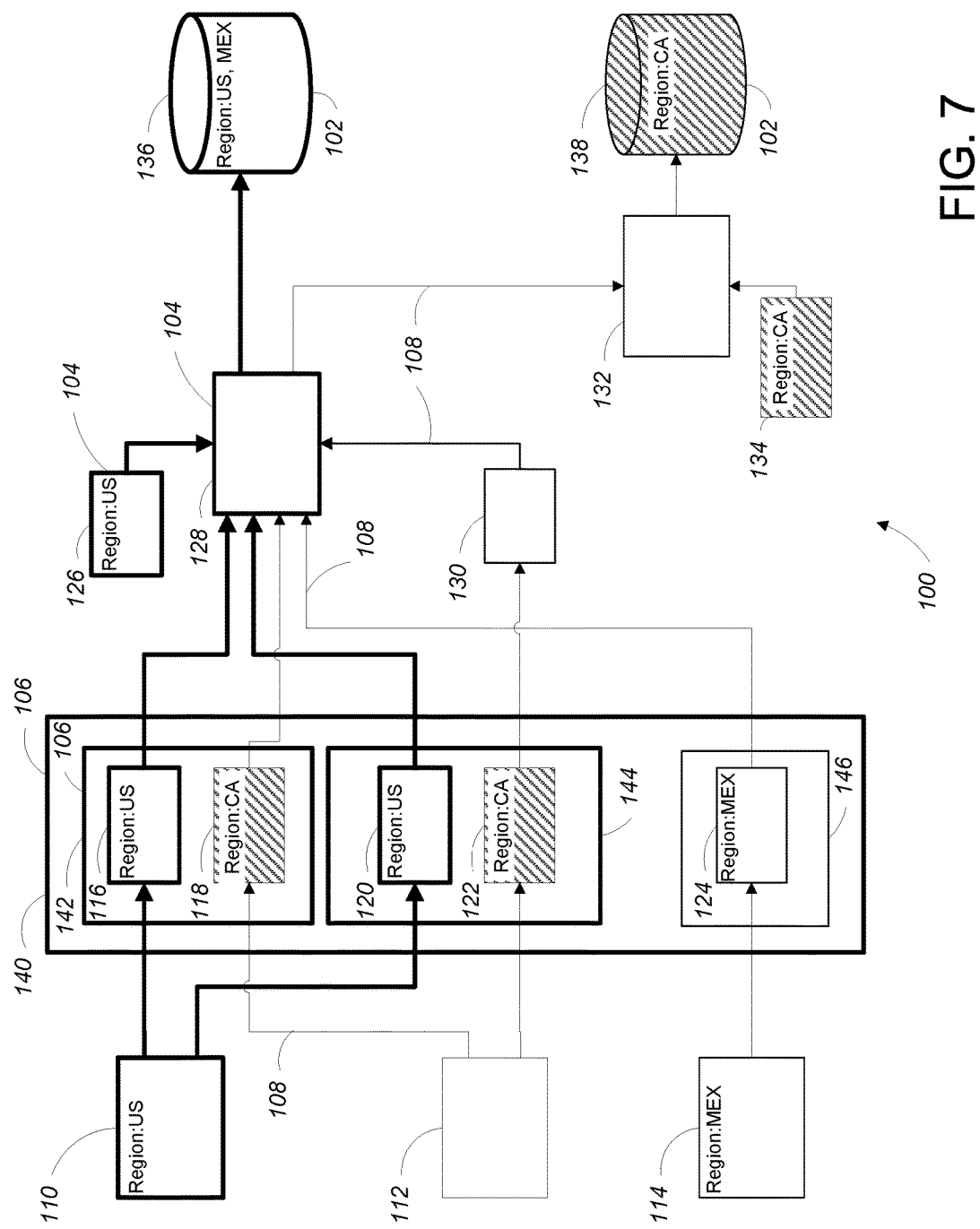
FIG. 7 is the data lineage diagram of FIG. 2a with a third data lineage path traversed.

Referring to FIG. 7, a third lineage path extending between the first data node 136 and the first data transformation node 110 is traversed by the data lineage module 25. Again, since the directed link 108 between the first data node 136 and the tenth data transformation node 128 was previously traversed, the data lineage module 25 begins its traversal by traversing the directed link 108 between the tenth data transformation node 128 and the sixth data transformation node 120.

When the lineage module 25 reaches the sixth data transformation node 120, the blacklist is searched to determine whether it includes the sixth data transformation node 120. Since the sixth data transformation node 120 is not present in the blacklist, it is marked for inclusion in the filtered data lineage. Note that the sixth data transformation node 120 is included in the third container node 144 which is nested in the first container node 140. Neither the first container node 140 nor the third container node 144 is associated with any lineage tag identifiers and therefore neither is included in the blacklist. Since the second lineage path traverses the boundaries of the first container node 140 and the third container node 144 and neither container node is in the blacklist, both the first container node 140 and the third container node 144 are marked for inclusion in the filtered data lineage.

The data lineage module 25 then traverses a directed link 108 between the sixth data transformation node 120 and the first data transformation node 110. When the lineage module 25 reaches the first data transformation node 110, the blacklist is searched to determine whether it includes the first data transformation node 110. Since the first data transformation node 110 is not present in the blacklist, it is marked for inclusion in the filtered data lineage. Since the first data transformation node 110 is at the edge of the lineage diagram 100, traversal of the third lineage path is complete.

Figure 8:
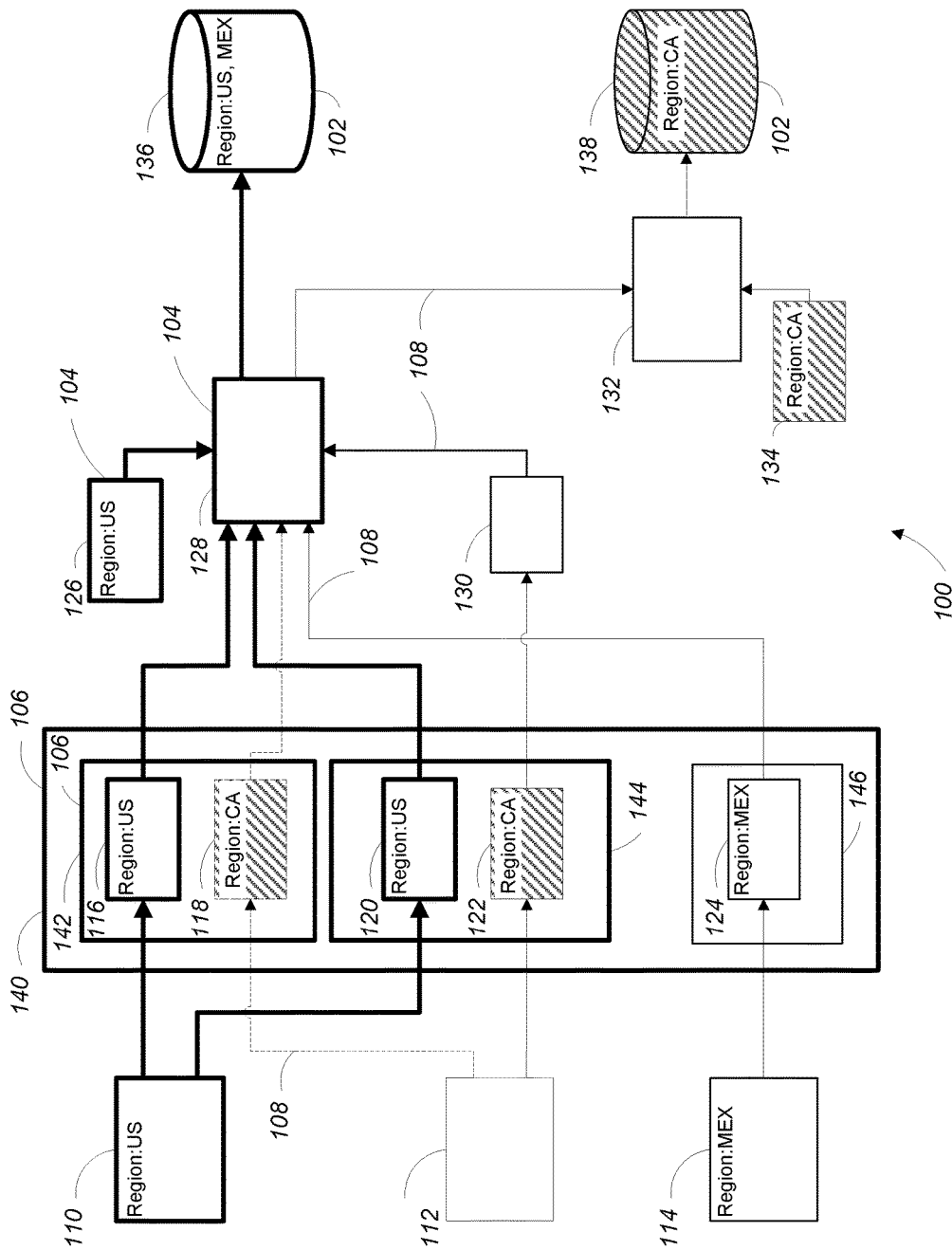
FIG. 8 is the data lineage diagram of FIG. 2a with a fourth data lineage path traversed.

Referring to FIG. 8, a fourth lineage path extending between the first data node 136 and the second data transformation node 112 is traversed by the data lineage module 25. Since the directed link 108 between the first data node 136 and the tenth data transformation node 128 was previously traversed, the data lineage module 25 begins its traversal by traversing the directed link 108 between the tenth data transformation node 128 and the fifth data transformation node 118.

When the lineage module 25 reaches the fifth data transformation node 118, the blacklist is searched to determine whether it includes the fifth data transformation node 118. Since the fifth data transformation node 118 is present in the blacklist, it is excluded from the filtered data lineage. Since the fifth data transformation node 118 was determined to be present in the blacklist, traversal of the fourth lineage path is terminated.

Figure 9:
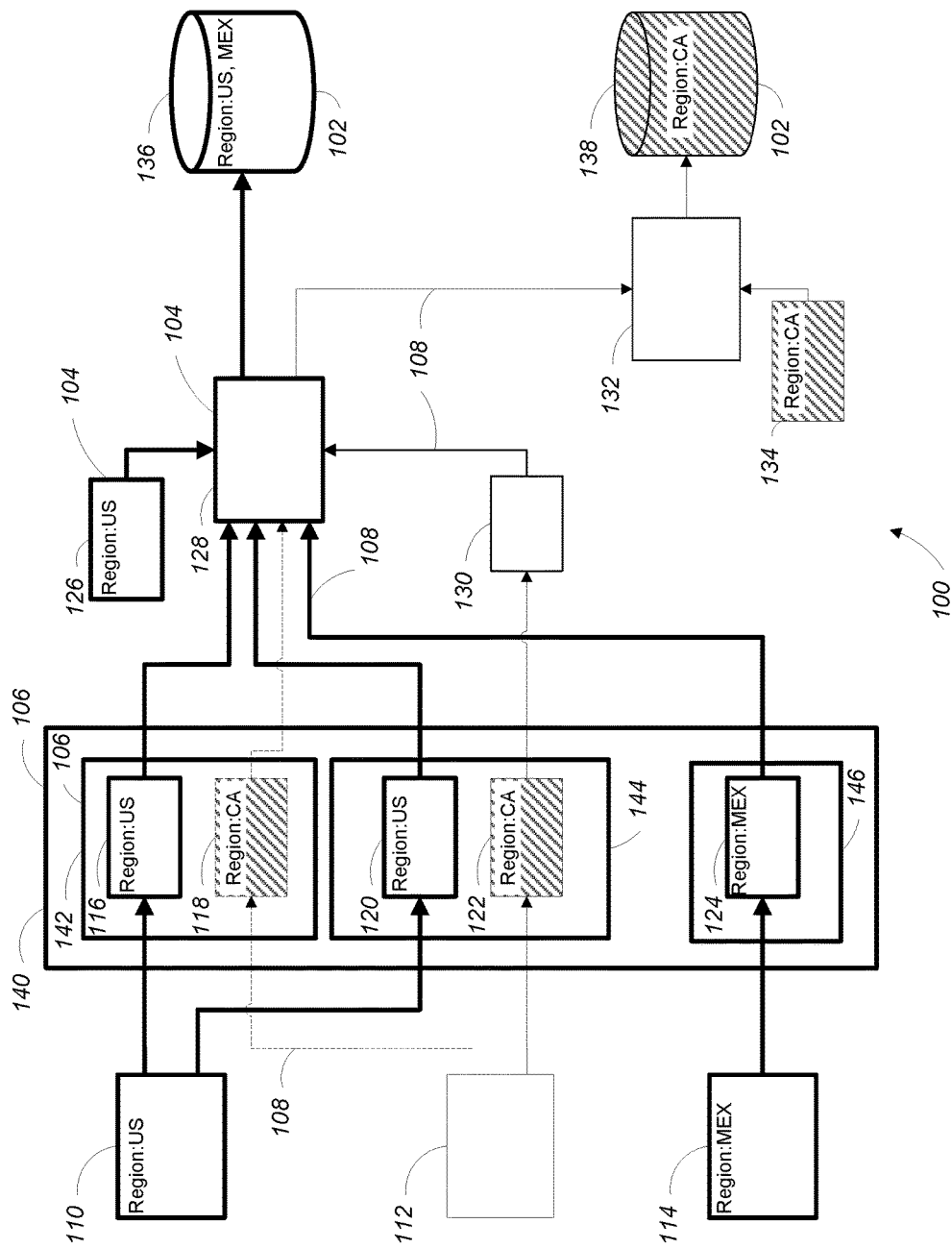
FIG. 9 is the data lineage diagram of FIG. 2a with a fifth data lineage path traversed.

Referring to FIG. 9, a fifth lineage path extending between the first data node 136 and the third data transformation node 114 is traversed by the data lineage module 25. Since the directed link 108 between the first data node 136 and the tenth data transformation node 128 was previously traversed, the data lineage module 25 begins its traversal by traversing the directed link 108 between the tenth data transformation node 128 and the eighth data transformation node 124.

When the lineage module 25 reaches the eighth data transformation node 124, the blacklist is searched to determine whether it includes the eighth data transformation node 124. Since the eighth data transformation node 124 is not present in the blacklist, it is marked for inclusion in the filtered data lineage. Note that the eighth data transformation node 124 is included in the fourth container node 146 which is nested in the first container node 140. Neither of the first container node 140 and the fourth container node 146 is associated with any lineage tag identifiers and therefore neither is included in the blacklist. Since the fifth lineage path traverses the boundaries of the first container node 140 and the fourth container node 146 and neither container node is in the blacklist, both the first container node 140 and the fourth container node 146 are marked for inclusion in the filtered data lineage.

The data lineage module 25 then traverses a directed link between the eighth data transformation node 124 and the third data transformation node 114. When the lineage module 25 reaches the third data transformation node 114, the blacklist is searched to determine whether it includes the third data transformation node 114. Since the third data transformation node 114 is not present in the blacklist, it is marked for inclusion in the filtered data lineage. Since the third data transformation node 114 is at the edge of the lineage diagram 100, traversal of the fifth lineage path is complete.

Figure 10:
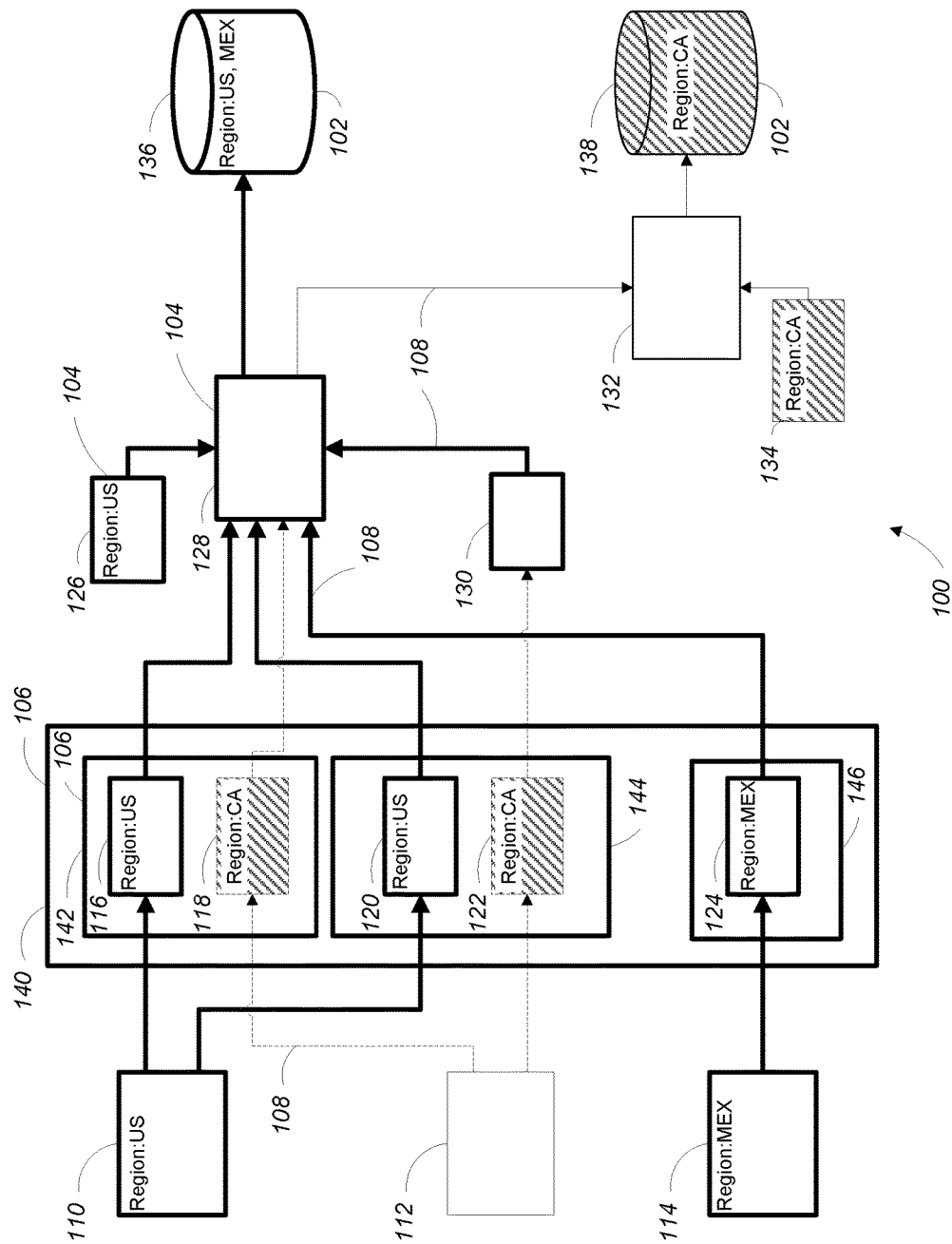
FIG. 10 is the data lineage diagram of FIG. 2a with a sixth data lineage path traversed.

Referring to FIG. 10, a sixth lineage path extending between the first data node 136 and the second data transformation node 112 is traversed by the data lineage module 25. Since the directed link 108 between the first data node 136 and the tenth data transformation node 128 was previously traversed, the data lineage module 25 begins its traversal by traversing the directed link 108 between the tenth data transformation node 128 and the eleventh data transformation node 130.

When the lineage module 25 reaches the eleventh data transformation node 130, the blacklist is searched to determine whether it includes the eleventh data transformation node 130. Since the eleventh data transformation node 130 is not present in the blacklist, it is marked for inclusion in the filtered data lineage.

The data lineage module 25 then traverses a directed link between the eleventh data transformation node 130 and the seventh data transformation node 122. When the lineage module 25 reaches the seventh data transformation node 122, the blacklist is searched to determine whether it includes the seventh data transformation node 122. Since the seventh data transformation node 122 is present in the blacklist, it is excluded from the filtered data lineage. Since the seventh data transformation node 122 was determined to be present in the blacklist, traversal of the sixth lineage path is terminated.

Figure 11:
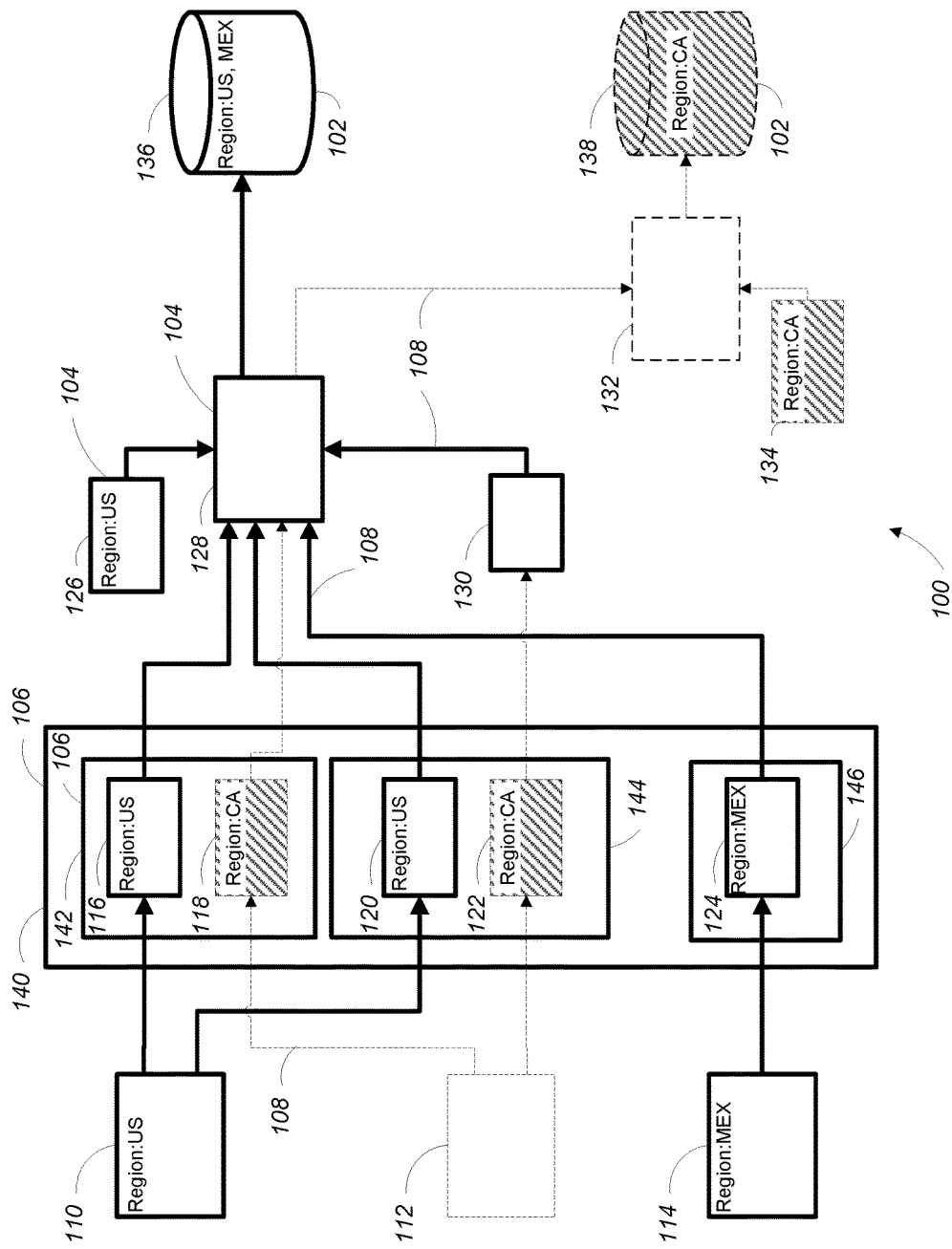
FIG. 11 is the data lineage diagram of FIG. 2a with extraneous nodes excluded.

Referring to FIG. 11, since the twelfth data transformation component 132, the thirteenth data transformation component 134, and the second data node 138 are not on a lineage path originating from the first data node 136, they are excluded from the filtered data lineage by default.

Note that, the second data transformation node 112 is never reached during the traversals of any of the directed links and is therefore excluded from the filtered data lineage.

Figure 12:
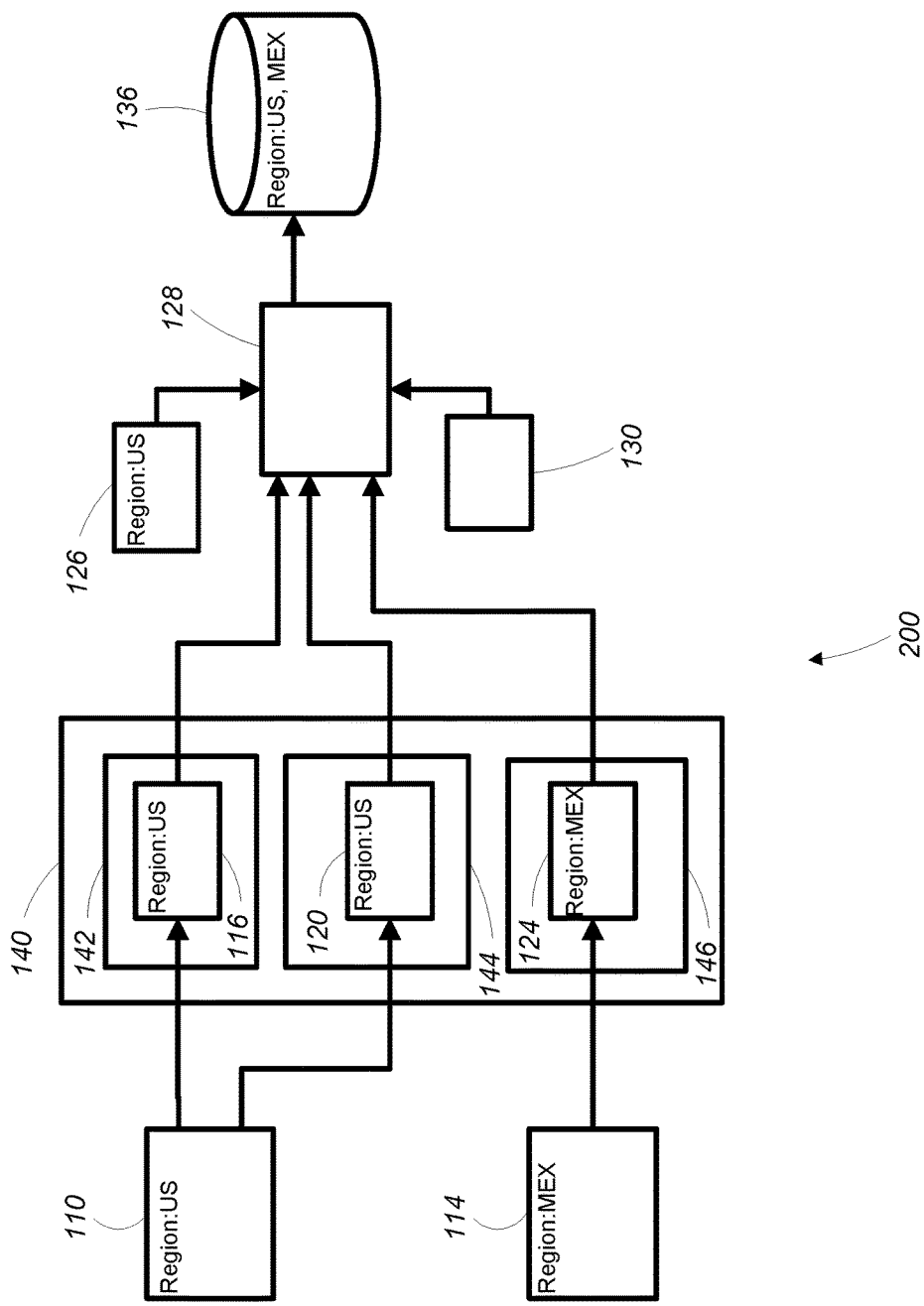
FIG. 12 is a second filtered data lineage diagram for Region: US, MEX.

Referring to FIG. 12, once all lineage paths originating from the first data node 136 are traversed, any nodes not marked for inclusion in the filtered data lineage are removed from the end-to-end data lineage diagram 100, resulting in a filtered data lineage diagram 200. Note that the filtered data lineage diagram 200 excludes nodes associated with the "Region" lineage tag identifier and having lineage tag values including only "CA."

2 Normalization/De-Normalization

Figure 13:
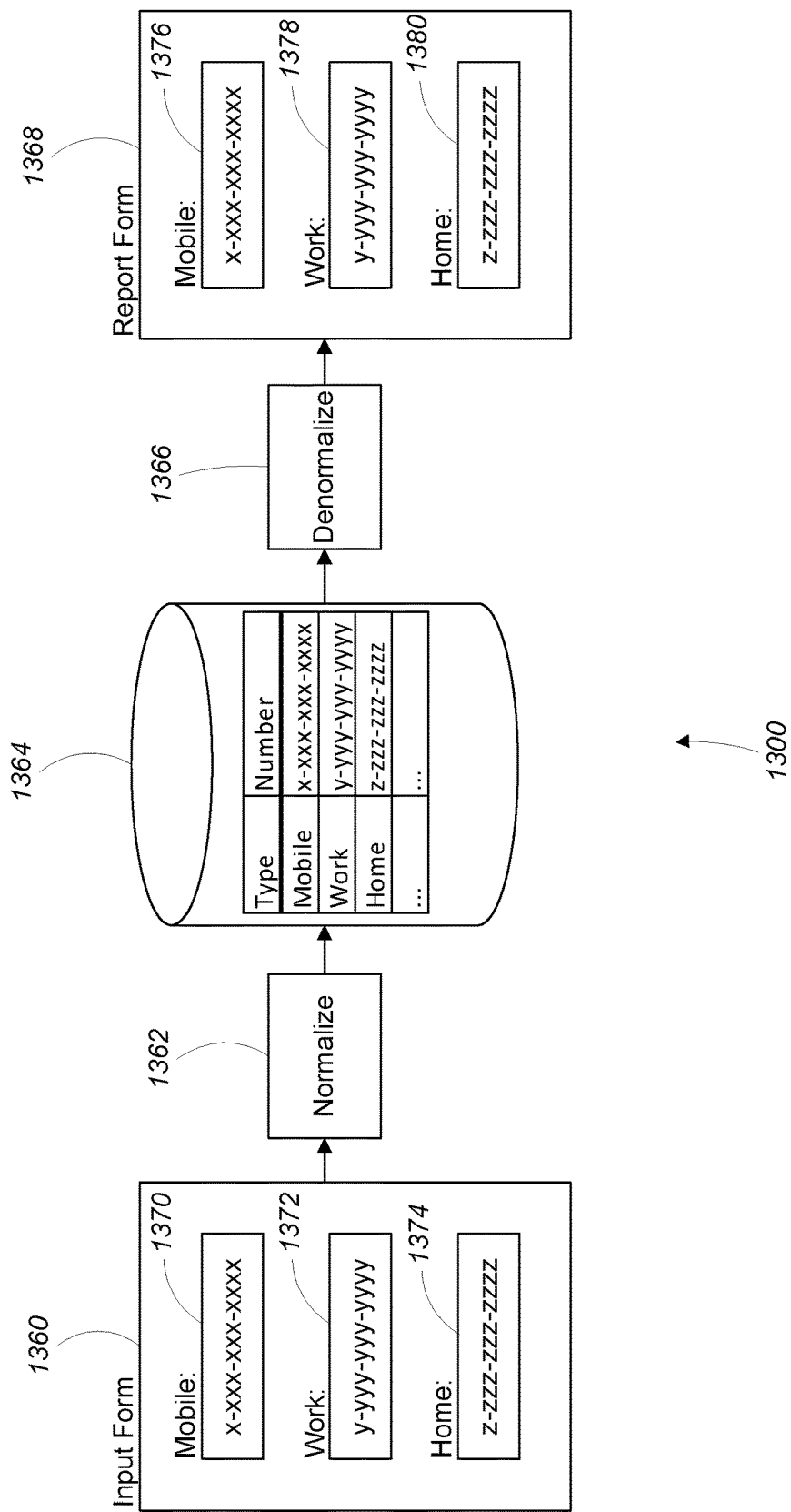
FIG. 13 is a data lineage diagram of a computer program configured to perform data normalization and de-normalization.

Referring to FIG. 13, a simple, exemplary end-to-end data lineage diagram 1300 of a computer program 27 includes an input form 1360, a normalization data transformation node 1362, a data node 1364, a de-normalization data transformation node 1366, and a report form 1368. The input form 1360 and the report form 1368 are data nodes that each include within them multiple data nodes corresponding to different data elements nested within a higher level data element. In this example the nested data elements represent different fields within a record of each form.

The normalization data transformation node 1362 performs a normalization operation that normalizes data elements being stored in a data store represented by the data node 1354, and the de-normalization data transformation node 1366 performs a de-normalization operation that de-normalizes data elements being retrieved from the data store represented by the data node 1354. While the specific implementation of the "normalizing" of the normalization operation and "de-normalizing" of the de-normalization operation may vary, generally, they have the following characteristics. Normalizing data elements includes transforming a record corresponding to multiple data elements into multiple records that have a common format for at least one field. De-normalizing data elements includes transforming multiple records that have a common format for at least one field into a single record corresponding to multiple data elements. The following is an example of such operations in the context of the data lineage diagram 1300.

The input form 1360 includes a first field 1370 including a mobile telephone number, a second field 1372 including a work telephone number, and a third field 1374 including a home telephone number. In operation, the normalization data transformation node 1362 receives the input form 1360 and converts the phone numbers included in the input form 1360 into a normalized form suitable for storage in the data node 1364. In some examples, the normalization data transformation node 1362 converts the phone numbers included in the input form 1360 into a [Phone Number Type, Phone Number] form, where Phone Number is an enumerated data type with three values: Mobile, Work, and Home. In the context of the aspects described herein, the above-described process of converting a data element having a data element type and a data element value into a data structure including a data element type field and a data element value field is referred to as "normalizing" the data element. The normalized phone numbers are stored in the data node 1364 for later use.

The de-normalization data transformation node 1366 reads the normalized phone numbers from the data node 1364 and de-normalizes the normalized phone numbers back to their original form. In the context of the aspects described herein, the above-described process of converting a normalized data structure back to a data element having a data element type and a data element value is referred to as "de-normalizing" the data element. The de-normalization data transformation node 1366 then writes the mobile phone number into a fourth field 1376 of the report form 1368 for storing a mobile telephone number, a fifth field 1378 of the report form 1368 for storing a work telephone number, and a sixth field 1380 of the report form 1368 for storing a home telephone number.

The normalization/de-normalization process described above can be difficult for conventional data lineage calculation systems to handle due to the conversion of data items to and from a normalized, enumerated data type. For example, if a user requires a data lineage diagram for the mobile telephone number in the fourth field 1376 of the report form 1368, a conventionally generated data lineage diagram would include the mobile telephone number in the fourth field 1376 of the report form 1368, the de-normalization data transformation node 1366, the data node 1364, the normalization data transformation node 1362, and the first field 1370 of the input form 1368.

The conventionally generated data lineage diagram would also include the work telephone number in the second field 1372 of the input form 1360 and the home telephone number in the third field 1374 of the input form 1360. Such a conventional data lineage diagram is incorrect since the work telephone number in the second field 1372 and the home telephone number in the third field 1374 are not actually part of the data lineage for the mobile telephone number in the fourth field 1376 of the report form 1368.

Figure 14:
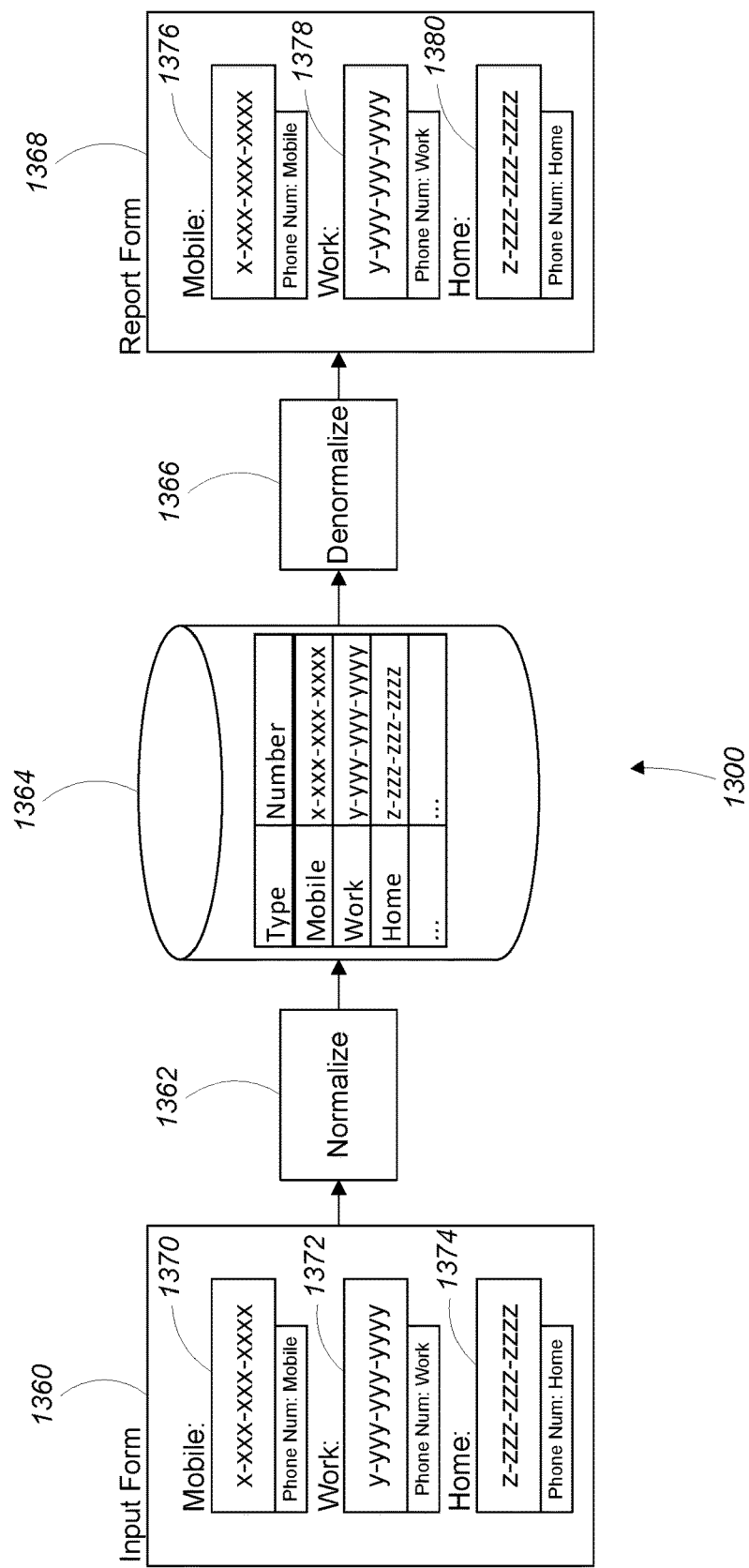
FIG. 14 is the data lineage diagram of FIG. 13 including lineage tags associated with some nodes.

Referring to FIG. 14, to prevent generation of incorrect data lineage diagrams, the various fields (which are essentially data nodes) in the end-to-end data lineage diagram 1300 are tagged with a lineage tag having a lineage tag identifier "Phone Num" and possible lineage tag values of "Mobile," "Work," and "Home." In particular, the first field 1370 is tagged with a lineage tag having the "Phone Num" lineage tag identifier and a subset of the possible lineage tag values including only "Mobile." The second field 1372 is tagged with a lineage tag having the "Phone Num" lineage tag identifier and a subset of the possible lineage tag values including only "Work." The third field 1374 is tagged with a lineage tag having the "Phone Num" lineage tag identifier and a subset of the possible lineage tag values including only "Home."

The fourth field 1376 is tagged with a lineage tag having the "Phone Num" lineage tag identifier and a subset of the possible lineage tag values including only "Mobile." The fifth field 1378 is tagged with a lineage tag having the "Phone Num" lineage tag identifier and a subset of the possible lineage tag values including only "Work." The sixth field 1380 is tagged with a lineage tag having the "Phone Num" lineage tag identifier and a subset of the possible lineage tag values including only "Home."

Figure 15:
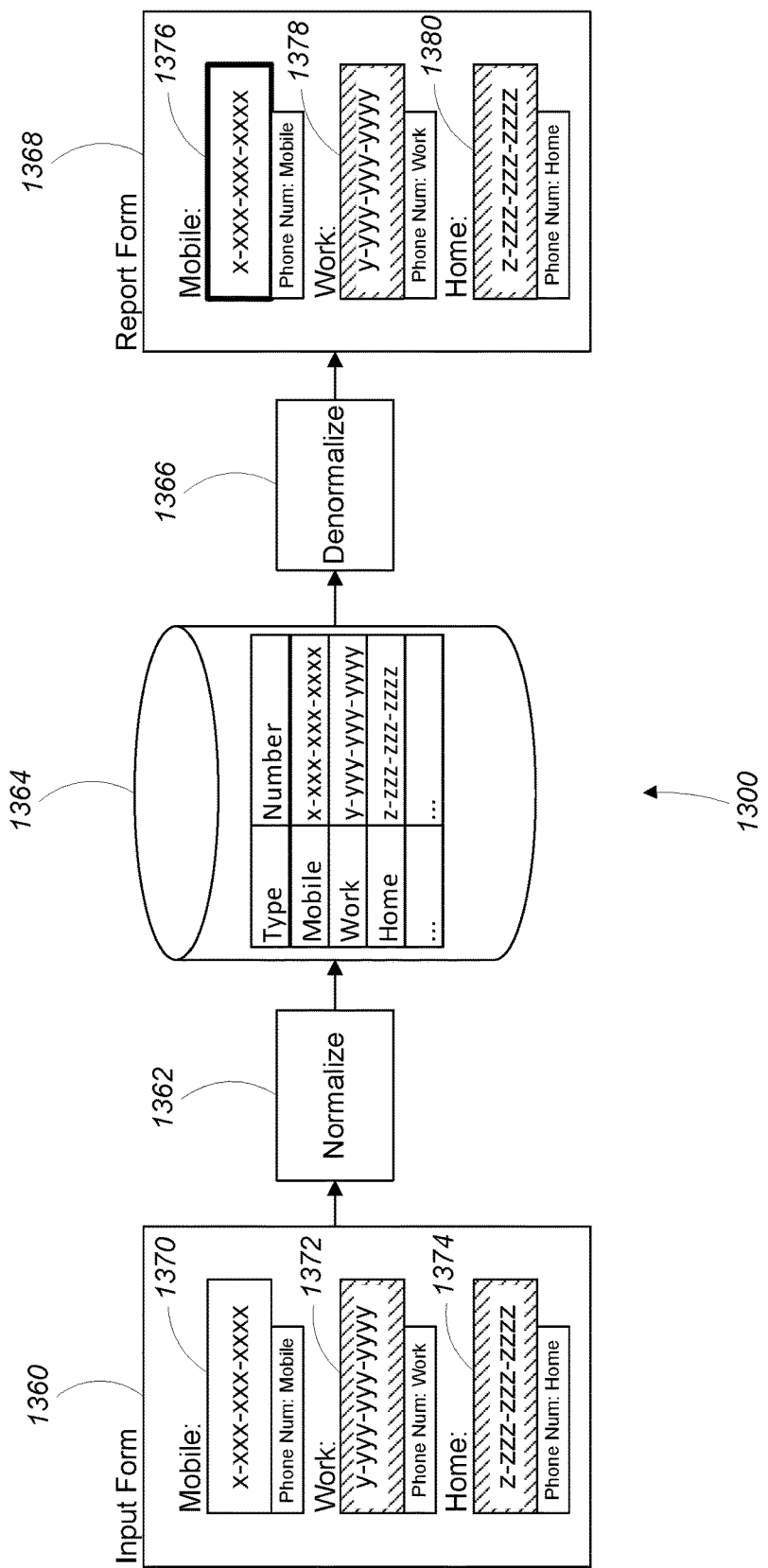
FIG. 15 is the data lineage diagram of FIG. 13 with certain nodes added to a blacklist.

Referring to FIG. 15, when a user selects the fourth field 1376 including the mobile telephone number for generation of a filtered data lineage diagram, the data lineage module 25 first determines an association between the fourth field 1376 and one or more lineage tag identifiers. In this case, the fourth field 1376 is associated with the "Phone Num" lineage tag identifier. The data lineage module 25 then determines which tag values of the possible tag values for the "Phone Num" tag identifier are associated with the fourth field 1376. In this case, the "Mobile" tag value is the only tag value associated with the fourth field 1376.

The data lineage module 25 then processes the end-to-end data lineage diagram 1300 to generate a blacklist. As is described above, the blacklist is generated by examining all nodes and fields in the end-to-end data lineage diagram 1300 other than the selected fourth field 1376 to identify nodes and fields associated with the "Phone Num" lineage tag identifier and having a subset of tag values including only "Work" and/or "Home." Applying the filtering algorithm 300 of FIG. 3 to the end-to-end data lineage diagram 1300 results in the second field 1372, the third field 1374, the fifth field 1378, and the sixth field 1380 being added to the blacklist. In FIG. 15 data lineage fields that are added to the blacklist are filled with a diagonal line pattern.

Figure 16:
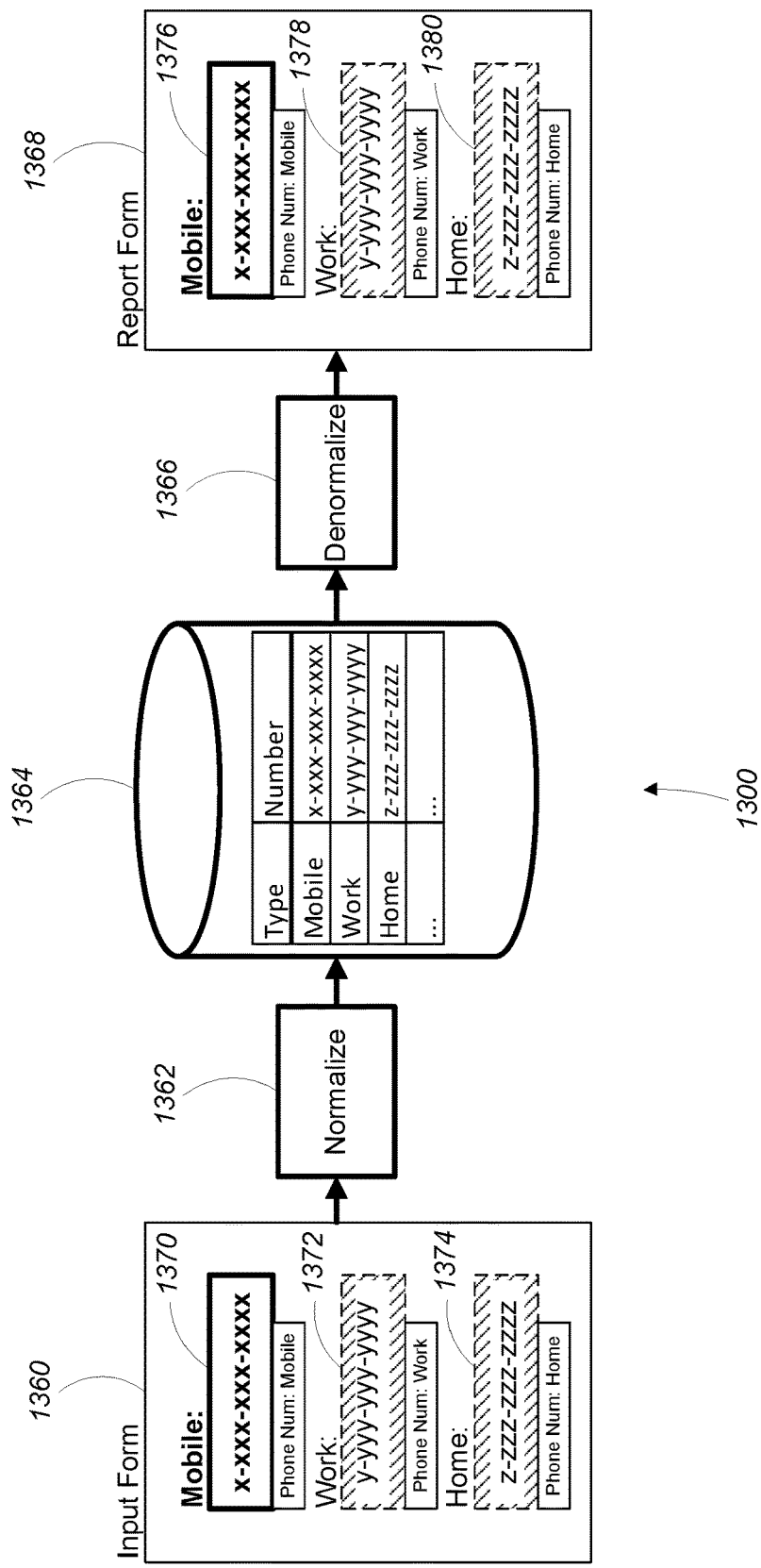
FIG. 16 is the data lineage diagram of FIG. 13 during the process of lineage tag based filtering.

Referring to FIG. 16, the data lineage module 25 then traverses all lineage paths originating from the fourth field 1376 to determine which nodes and fields are included in the filtered data lineage and which nodes and fields are excluded from the filtered data lineage. As can be seen in the figure, the fields tagged with only "Work" and "Home" lineage tag values are marked for exclusion from the filtered data lineage by the data lineage module 25, while the fields tagged with only "Mobile" lineage tag values are marked for inclusion from the filtered data lineage.

Figure 17:
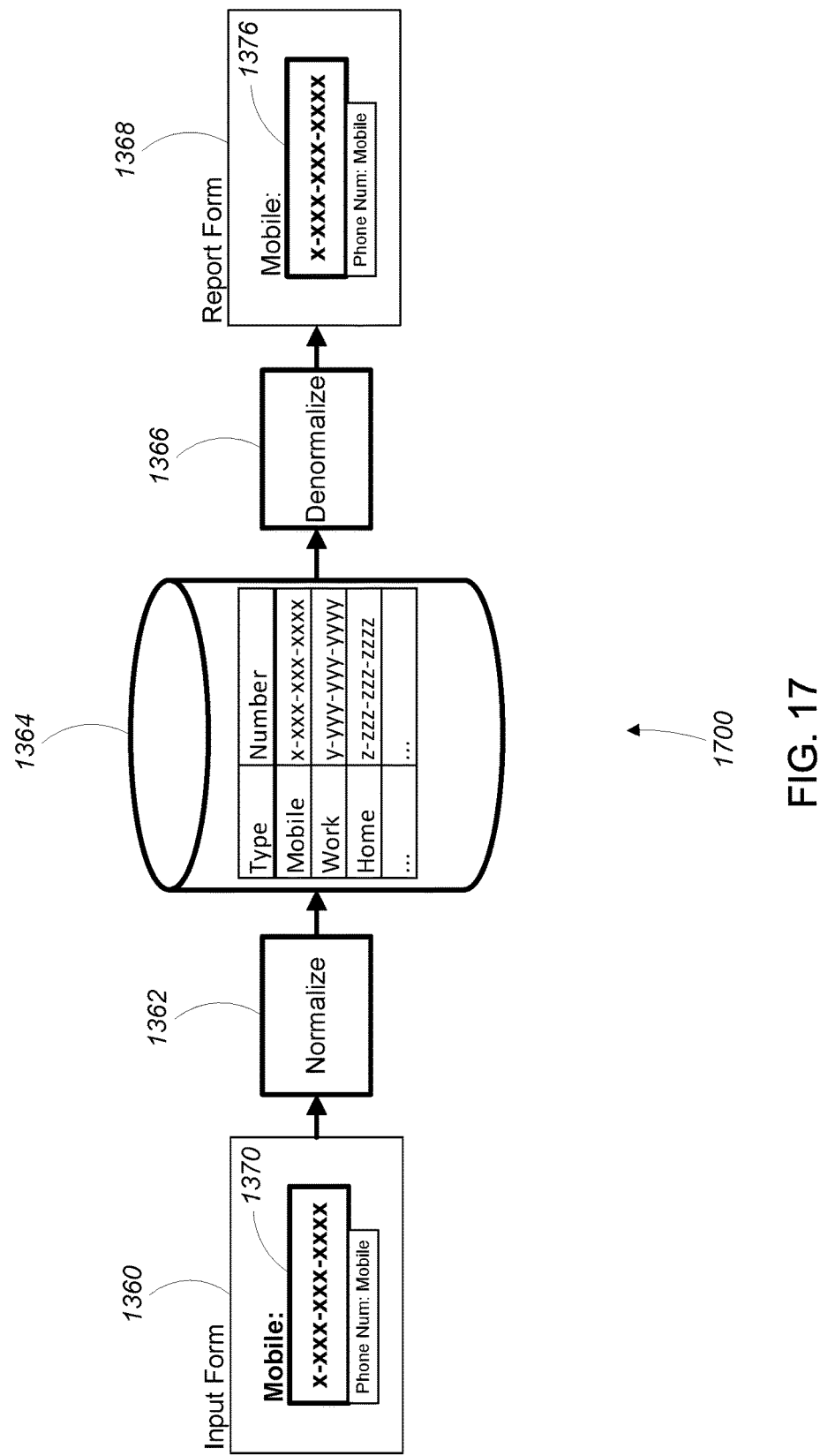
FIG. 17 is a filtered data lineage diagram.

Referring to FIG. 17, once all lineage paths originating from the fourth field 1376 are traversed, any nodes and fields not marked for inclusion in the filtered data lineage are removed from the end-to-end data lineage diagram 1300, resulting in a filtered data lineage diagram 1700. Note that the second field 1327 and the third field 1374, which would be incorrectly included in the filtered data lineage diagram by conventional lineage generation techniques, are excluded from the filtered data lineage diagram 1700.

3 Alternatives

It is noted that, while the nodes of the data lineage diagram in the lineage tag based filtering example above are traversed in a particular order, many different orders of traversal may be used. For example, a breadth first order of traversal or a depth first order of traversal may be used.

In the lineage tag based filtering example above, an initial node is selected and the lineage tags and lineage tag values associated with the initial node are used to filter the lineage diagram. However, in some examples, a user selects an initial node and the data lineage module traverses the data lineage diagram to determine a complete data lineage for the initial node and to discover any lineage tags and lineage tag values that can be used to filter the complete data lineage. The complete data lineage for the initial node is then presented to the user along with the discovered lineage tags and lineage tag values. The user can then filter the complete data lineage by selecting one or more of the discovered lineage tags and lineage tag values as filtering parameters. In other examples, as the data lineage module traverses the data lineage diagram, a list of encountered lineage tags and lineage tag values is maintained. Some or all of the lineage tags and lineage tag values that are added to the list while traversing a first portion of the diagram can then be used while traversing a second, upstream portion of the diagram to filter the second portion of the diagram.

While the approaches described above are generally related to generation of data lineage diagrams, they can also be used to generate impact analysis diagrams.

In some examples, lineage tags associated with two or more nodes at different levels in the lineage hierarchy (e.g., a container node and a data transformation node within the container node) may conflict. In some examples, the node at the lowest level in the lineage hierarchy is chosen as the lineage tag.

In the examples described above, data transformation nodes are shown as being directly connected to one another by flows represented as arrows. However, it is noted that in some examples a flow that connects an output of a first component to an input of a second component may implicitly include a data storage element that is written to by the data coming out of the first component and is read by the input of the second component.

4 Implementations

The data lineage generation approaches described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for managing lineage information in a computing system, the method including:
   storing, in a data storage system, a specification of a directed graph that includes a plurality of nodes and directed links that represent respective lineage relationships between the plurality of nodes, at least some of the nodes being associated with one or more tag identifiers of a plurality of tag identifiers, at least one tag identifier of the plurality of tag identifiers having a plurality of possible tag values;
   processing, using at least one processor, a request for a representation of data lineage for a first node of the plurality of nodes, the processing including:
      determining an association between the first node and at least a first tag identifier of the plurality of tag identifiers, and determining a first subset of at least one and fewer than all of a plurality of possible tag values for the first tag identifier; and traversing nodes along a first lineage path of directed links from the first node to determine a data lineage for the first node, where the data lineage includes one or both of (1) a dependency lineage that includes a unidirectional upstream lineage path of directed links upstream of the first node, and (2) an impact lineage that includes a unidirectional downstream lineage path of directed links downstream of the first node, and where determining the data lineage includes, for each traversed node determining whether to add the traversed node to the data lineage or to exclude the traversed node from the data lineage based at least in part on any tag identifiers or tag values associated with the traversed node.

2. The method of claim 1 wherein determining the data lineage includes, for each traversed node:
adding the traversed node to the data lineage if the traversed node is not associated with the first tag identifier, or the traversed node is associated with the first tag identifier and is associated with at least one tag value of the first subset; or
excluding the traversed node from the data lineage if the traversed node is associated with the first tag identifier and is not associated with at least one tag value of the first subset of the plurality of possible tag values for the first tag identifier.

3. The method of claim 2 further including, upon excluding a traversed node from the data lineage, terminating traversing of the first lineage path.

4. The method of claim 1 further including analyzing the plurality of nodes, prior to traversing the nodes of the plurality of nodes, to determine a first subset of the plurality of nodes that are associated with the first tag identifier and are not associated with at least one tag value of the first subset of the plurality of possible tag values for the first tag identifier.

5. The method of claim 4 wherein determining whether to add the traversed node to the data lineage or to exclude the traversed node from the data lineage includes determining whether the traversed node is included in the first subset of the plurality of nodes.

6. The method of claim 5 wherein determining whether to add the traversed node to the data lineage includes adding the traversed node to the data lineage if the traversed node is not included in the first subset of the plurality of nodes and excluding the traversed node from the data lineage if the traversed node is included in the first subset of the plurality of nodes.

7. The method of claim 1 wherein at least some nodes of the plurality of nodes are nested within other nodes of the plurality of nodes.

8. The method of claim 7 wherein tag identifiers and their associated subsets of tag values associated with nodes at lower levels of a nested hierarchy of nodes are given priority over tag identifiers and their associated subsets of tag values associated with nodes at higher levels of the nested hierarchy of nodes.

9. The method of claim 1 wherein traversing the nodes along the first lineage path includes traversing the nodes beginning from the first node and in a direction opposite a direction of the directed links.

10. The method of claim 1 further including generating the specification of the directed graph, where one or more of the plurality of nodes represent computation, one or more of the plurality of nodes represent data elements received or produced by a computation during execution of the computation, and the directed links representing lineage relationships between a computation and a data element.

11. The method of claim 10 wherein one or more of the plurality of nodes represents a grouping of one or more other nodes of the plurality of nodes.

12. The method of claim 1 wherein the first subset of the plurality of possible tag values for the first tag identifier consists of one or more tag values that are associated with the first node.

13. The method of claim 1 wherein the first subset of the plurality of possible tag values for the first tag identifier consists of one or more tag values that are received from user input.

14. The method of claim 1 further including traversing nodes along a plurality of lineage paths of directed links from the first node to determine a data lineage for the first node, where determining the data lineage includes, for each traversed node determining whether to add the traversed node to the data lineage or to exclude the traversed node from the data lineage based at least in part on any tag identifiers or tag values associated with the traversed node.

15. The method of claim 1 further including adding the first node to the data lineage by default.

16. The method of claim 1 wherein traversing the nodes along the first lineage path of directed links comprises traversing the nodes, represented in a data lineage diagram, along the first lineage path of directed links to determine the data lineage for the first node, wherein traversed nodes added to the data lineage for the first node are used to generate, from the data lineage diagram, a resulting simplified filtered data lineage diagram without using excluded traversed nodes.

17. Software stored on a computer-readable medium, for managing lineage information in a computing system, the software including instructions for causing a computing system to:
store, in a data storage system, a specification of a directed graph that includes a plurality of nodes and directed links that represent respective lineage relationships between the plurality of nodes, at least some of the nodes being associated with one or more tag identifiers of a plurality of tag identifiers, at least one tag identifier of the plurality of tag identifiers having a plurality of possible tag values; and
process, using at least one processor, a request for a representation of data lineage for a first node of the plurality of nodes, the processing including:
determining an association between the first node and at least a first tag identifier of the plurality of tag identifiers, and determining a first subset of at least one and fewer than all of a plurality of possible tag values for the first tag identifier; and
traversing nodes along a first lineage path of directed links from the first node to determine a data lineage for the first node, where the data lineage includes one or both of (1) a dependency lineage that includes a unidirectional upstream lineage path of directed links upstream of the first node, and (2) an impact lineage that includes a unidirectional downstream lineage path of directed links downstream of the first node, and where determining the data lineage includes, for each traversed node determining whether to add the traversed node to the data lineage or to exclude the traversed node from the data lineage based at least in part on any tag identifiers or tag values associated with the traversed node.

18. A computing system for managing lineage information, the computing system including:
- a data storage system storing a specification of a directed graph that includes a plurality of nodes and directed links that represent respective lineage relationships between the plurality of nodes, at least some of the nodes being associated with one or more tag identifiers of a plurality of tag identifiers, at least one tag identifier of the plurality of tag identifiers having a plurality of possible tag values; and
- at least one processor configured to process a request for a representation of data lineage for a first node of the plurality of nodes, the processing including:
  - determining an association between the first node and at least a first tag identifier of the plurality of tag identifiers, and determining a first subset of at least one and fewer than all of a plurality of possible tag values for the first tag identifier; and
  - traversing nodes along a first lineage path of directed links from the first node to determine a data lineage for the first node, where the data lineage includes one or both of (1) a dependency lineage that includes a unidirectional upstream lineage path of directed links upstream of the first node, and (2) an impact lineage that includes a unidirectional downstream lineage path of directed links downstream of the first node, and where determining the data lineage includes, for each traversed node determining whether to add the traversed node to the data lineage or to exclude the traversed node from the data lineage based at least in part on any tag identifiers or tag values associated with the traversed node.

19. A computing system for managing lineage information, the computing system including:
- means for storing a specification of a directed graph that includes a plurality of nodes and directed links that represent respective lineage relationships between the plurality of nodes, at least some of the nodes being associated with one or more tag identifiers of a plurality of tag identifiers, at least one tag identifier of the plurality of tag identifiers having a plurality of possible tag values;
- means for processing a request for a representation of data lineage for a first node of the plurality of nodes, the processing including:
  - determining an association between the first node and at least a first tag identifier of the plurality of tag identifiers, and determining a first subset of at least one and fewer than all of a plurality of possible tag values for the first tag identifier; and
  - traversing nodes along a first lineage path of directed links from the first node to determine a data lineage for the first node, where the data lineage includes one or both of (1) a dependency lineage that includes a unidirectional upstream lineage path of directed links upstream of the first node, and (2) an impact lineage that includes a unidirectional downstream lineage path of directed links downstream of the first node, and where determining the data lineage includes, for each traversed node determining whether to add the traversed node to the data lineage or to exclude the traversed node from the data lineage based at least in part on any tag identifiers or tag values associated with the traversed node.

* * * * *